(12) United States Patent
Miyazaki et al.

(10) Patent No.: US 7,873,798 B2
(45) Date of Patent: Jan. 18, 2011

(54) INFORMATION PROCESSING DEVICE AND METHOD, RECORDING MEDIUM, AND PROGRAM

(75) Inventors: Mitsuhiro Miyazaki, Kanagawa (JP); Noriyuki Yamamoto, Kanagawa (JP); Mari Saito, Kanagawa (JP); Hiroyuki Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 282 days.

(21) Appl. No.: 10/538,658

(22) PCT Filed: Dec. 12, 2003

(86) PCT No.: PCT/JP03/15927
§ 371 (c)(1),
(2), (4) Date: Jun. 10, 2005

(87) PCT Pub. No.: WO2004/053736
PCT Pub. Date: Jun. 24, 2004

(65) Prior Publication Data
US 2006/0047678 A1   Mar. 2, 2006

(30) Foreign Application Priority Data

Dec. 12, 2002 (JP) .............................. 2002-361540
Aug. 1, 2003 (JP) .............................. 2003-285030

(51) Int. Cl.
*G06F 13/00* (2006.01)
(52) U.S. Cl. .............................. 711/154; 725/44; 725/46
(58) Field of Classification Search .................. 707/102; 711/154; 709/102; 725/44, 46
See application file for complete search history.

(56) References Cited

U.S. PATENT DOCUMENTS 6,370,526 B1 *  4/2002  Agrawal et al. ................ 707/5

(Continued)

FOREIGN PATENT DOCUMENTS

EP          0 854 645 A2    7/1998

(Continued)

OTHER PUBLICATIONS

Yuichi Yagawa, et al., "TV Program Planning Agent using Analysis Method of User's Taste", The Institute of Electronics, Information and Communication Engineers Technical Report of IEICE, vol. 98, No. 437, Dec. 1, 1998, pp. 9-16, p. 1-1 (with English Abstract).

*Primary Examiner*—Yong Choe
(74) *Attorney, Agent, or Firm*—Oblon, Spivak, McClelland, Maier & Neustadt, L.L.P.

(57) ABSTRACT

An information processing apparatus, an information processing method, a recording medium, and a program for generating preference information based on consecutively and inconsecutively viewed programs recommends the programs matching a user's preferences. A preference information extraction unit extracts program preference information based on metadata about programs and records a history of viewing of the programs. Preference information about a program that has been viewed for the first time is recorded as special program preference information. User preference information is generated on the basis of information about the preferred programs whose viewing count has exceeded a threshold value. A control unit automatically makes recording reservations of the programs whose viewing count has exceeded the threshold value. If an automatic recording reservation is canceled, a preference information updating unit updates the user preference information to reflect the metadata about the program whose recording reservation has been canceled.

16 Claims, 32 Drawing Sheets

U.S. PATENT DOCUMENTS

| | | | |
|---|---|---|---|
| 6,987,221 B2 * | 1/2006 | Platt | 84/601 |
| 7,581,237 B1 * | 8/2009 | Kurapati | 725/46 |
| 2001/0018685 A1 * | 8/2001 | Saito et al. | 707/3 |
| 2002/0157096 A1 * | 10/2002 | Hane et al. | 725/46 |
| 2003/0061239 A1 * | 3/2003 | Yoon | 707/104.1 |
| 2003/0135513 A1 * | 7/2003 | Quinn et al. | 707/102 |
| 2005/0185055 A1 * | 8/2005 | Miller et al. | 348/207.1 |

FOREIGN PATENT DOCUMENTS

| | | |
|---|---|---|
| EP | 0 854 645 A3 | 7/1998 |
| EP | 0 858 223 A2 | 8/1998 |
| EP | 0 858 223 A3 | 8/1998 |
| EP | 1 137 282 A2 | 9/2001 |
| EP | 1 137 282 A3 | 9/2001 |
| JP | 6-124309 | 5/1994 |
| JP | 11-196389 | 7/1999 |
| JP | 2001-92832 | 4/2001 |
| JP | 2002-320159 | 10/2002 |
| JP | 2002320159 A * | 10/2002 |
| WO | WO 00/05884 | 2/2000 |

* cited by examiner

FIG. 3

| START TIME, END TIME, BROADCAST STATION | GROUP ID |
|---|---|
| 00:00~06:00 ON CHANNEL 8 | XXXX |
| 06:00~07:00 ON CHANNEL 8 | XXXX |
| 07:00~08:00 ON CHANNEL 8 | XXXX |
| ...... | |
| 00:00~06:00 ON CHANNEL 10 | XXXX |
| 06:00~07:00 ON CHANNEL 10 | XXXX |
| 07:00~08:00 ON CHANNEL 10 | XXXX |
| ...... | |

FIG.4

| GENRE, PERSONS | GROUP ID |
|---|---|
| VARIETY, PERSONALITY A | XXXX |
| NEWS, PERSONALITY A | XXXX |
| MOVIE, PERSONALITY A | XXXX |
| ⋮ | |
| VARIETY, PERSONALITY B | XXXX |
| NEWS, PERSONALITY B | XXXX |
| MOVIE, PERSONALITY B | XXXX |
| ⋮ | |

- BROADCAST START TIME=[19:00,NOV/10/2002]
- BROADCAST END TIME=[20:00,NOV/10/2002]
- BROADCAST STATION =[CHANNEL 6]
- GENRE=[VARIETY SHOW]
- PROGRAM TITLE=[SIDEPLITTING TV]
- PERSONS=[PERSONALITY A][PERSONALITY B]...
- SUBTITLE=[SPECIAL EDITION TONIGHT! THE SPECIAL GUEST IS...]
- KEYWORD=[THRILLING]
- GROUP ID=XXXX,XXXX,...

FIG. 6

- BROADCAST START TIME=[7:00,OCT/18/2002]
- BROADCAST END TIME=[8:00,OCT/18/2002]
- BROADCAST STATION =[CANNEL 8]
- GENRE=[NEWS]
- PROGRAM TITLE=[MORNING NEWS]
- PERSONS=[PERSONALITY C] [PERSONALITY D],....
- SUBTITLE=[NEWS]
- KEYWORD=[XXXX]

GROUP ID=XXXX,XXXX

FIG. 10

| START TIME, END TIME, BROADCAST STATION | USE FREQUENCY |
|---|---|
| 20:00~21:00 ON CHANNEL 8 | 7 |
| 19:00~20:00 ON CHANNEL 10 | 7 |
| 20:00~23:00 ON CHANNEL 8 | 6 |
| ...... | |

FIG.11A

| GENRE, PERSONS | USE FREQUENCY |
|---|---|
| VARIETY, PERSONALITY D | 10 |
| NEWS, PERSONALITY D | 8 |
| VARIETY, PERSONALITY C | 5 |
| ⋮ | ⋮ |

FIG.11B

| GENRE, PERSONS | NORMALIZED USE FREQUENCY |
|---|---|
| VARIETY, PERSONALITY D | 0.25 |
| NEWS, PERSONALITY D | 0.08 |
| VARIETY, PERSONALITY C | 0.0625 |
| ⋮ | ⋮ |

FIG. 12

| DELIVERY LIST<br>[20:00~21:00 ON CHANNEL 8] | USE HISTORY<br>[20:00~21:00 ON CHANNEL 8] |
|---|---|
| PROGRAM A ON OCT 25(SAT)<br>PROGRAM B ON OCT 24(FRI) | NOT VIEWED<br>VIEWED |

F I G . 1 3

| DELIVERY LIST<br>[VARIETY, PERSONALITY D] | USE HISTORY<br>[VARIETY, PERSONALITY D] |
|---|---|
| PROGRAM AA ON OCT 25(SAT)<br>PROGRAM AB ON OCT 25(SAT)<br>PROGRAM BA ON OCT 24(FRI) | NOT VIEWED<br>NOT VIEWED<br>NOT VIEWED |

FIG. 14

| DELIVERY LIST<br>[20:00~21:00 ON CHANNEL 8] | USE HISTORY<br>[20:00~21:00 ON CHANNEL 8] |
|---|---|
| PROGRAM A ON OCT 25(SAT)<br>PROGRAM B ON OCT 24(FRI)<br>PROGRAM C ON OCT 24(FRI)<br>PROGRAM D ON OCT 23(THU) | NOT VIEWED<br>VIEWED<br>VIEWED<br>VIEWED |

THE FOLLOWING PROGRAMS ARE RECOMMENDED FOR YOUR PREFERRED "TIME SLOTS!"

20:00~21:00 ON CHANNEL 8;
GROUP ID = XXXX

・TITLE OF PROGRAM AAA

19:00~20:00 ON CHANNEL 10;
GROUP ID = XXXX

・TITLE OF PROGRAM BBA

THE FOLLOWING PROGRAMS ARE RECOMMENDED FOR YOUR PREFERRED "GENRES AND PERSONS"

VARIETY, PERSONALITY C: GROUP ID = XXXX

NEWS, PERSONALITY D: GROUP ID = XXXX

・TITLE OF PROGRAM CCA
・TITLE OF PROGRAM CCB

| PROGRAM VECTORS | PP = (Tm, Gm, Pm, Sm, Hm, ...) |
|---|---|
| T : TITLE<br>G : GENRE<br><br>P : PERSON<br>S : TV STATION<br>H : HOUR | Tm = {TITLE}<br>Gm = {DRAMAS, VARIETY SHOWS, SPORTS, MOVIES, MUSIC,<br>      CHILD-ORIENTED AND EDUCATIONAL PROGRAMS,<br>      CULTURAL AND DOCUMENTARY PROGRAMS, NEWS<br>      AND REPORTS, OTHERS}<br>Pm = {PERSON A-1, PERSON B-3, ...}<br>Sm = {MHK GENERAL, MHK EDUCATIONAL, ASIA TV, TAS,<br>      FUSHI, TV NIPPON, TOTO, MHK BS1, MHK BS-2, WOWO}<br>Hm = {MORNING, DAYTIME, EVENING, PRIME TIME,<br>      LATE-NIGHT}<br>........ |

FIG. 25

| PREFERENCE INFORMATION | UP = (Tup, Gup, Pup, Sup, ···) |
|---|---|
| TITLE: | Tup = {(TITLE 1-12), (TITLE 2-3), ···} |
| GENRE: | Gup = {(DRAMAS-25), (VARIETY SHOWS-34), (SPORTS-42), (MOVIES-37), (MUSIC-73), (CHILD-ORIENTED AND EDUCATIONAL PROGRAMS-120), (CULTURAL AND DOCUMENTARY PROGRAMS-3), (NEWS AND REPORTS-5), (OTHERS-23)} |
| PERSON: | Pup = {(PERSON A-10), (PERSON B-43), ···} |
| TV STATION: | Sup = {MHK GENERAL-7, MHK EDUCATIONAL-4, ASIA TV-3, TAS-2, FUSHI-5, TV NIPPON-6, TOTO-0, MHK BS1-9, MHK BS2-1, WOWO-1} |
| ······ | |

INFORMATION PROCESSING DEVICE AND METHOD, RECORDING MEDIUM, AND PROGRAM

TECHNICAL FIELD

The present invention relates to an information processing apparatus, an information processing method, a recording medium, and a program. More particularly, the invention relates to an information processing apparatus, an information processing method, a recording medium, and a program for recommending content efficiently and effectively.

BACKGROUND ART

There exist content recommendation systems capable of searching delivered contents for those matching a user's preferences and providing the user with information about the contents thus detected (one such system is disclosed in Japanese Patent Laid-open No. 2000-287189).

The above type of system typically checks the contents for attributes that have been frequently selected by the user (e.g., one such attribute is the genre of contents), and recommends contents according to each attribute deemed to match the user's preferences.

However, the attributes of contents are generally established by their providers based on in-house content organizations and other circumstances specific to the providers. As a result, these attributes are often inappropriate as the basis for detecting efficiently or effectively the contents that may be recommended.

DISCLOSURE OF INVENTION

The present invention has been made in view of the above circumstances and provides an information processing apparatus, an information processing method, a recording medium, and a program for allowing a content-recommending party to reorganize contents into groups according to their attributes in order to recommend the contents by group.

According to an embodiment of the present invention, there is provided an information processing apparatus including: grouping means for organizing delivered contents into groups each constituted by the contents which are given the same group ID for having degrees of similarity higher than a predetermined value regarding a grouping item including at least one attribute item representative of a content attribute; calculating means for calculating frequency of uses of the contents with respect to each of the group IDs; generating means for generating user preference information indicating preferences of a user based on the use frequency calculated by the calculating means; and recommending means for giving content recommendations based on the user preference information generated by the generating means.

Preferably, the grouping attribute constituted by an attribute item indicating a broadcast time slot and by at least one other attribute item may be established for the information processing apparatus; and the grouping means may organize the delivered contents into groups by the established grouping attribute.

Preferably, the grouping item constituted by at least an attribute item indicating a broadcast time slot and the grouping item formed by other attribute items may be established for the information processing apparatus; and the grouping means may organize the delivered contents into groups by each of the established grouping items.

Preferably, the grouping means may morphologically analyze constituent items making up the attribute item of the contents, and determine degrees of similarity between constituent items making up the grouping item based on results of the analysis.

The generating means may preferably not utilize the use frequency of the group constituted by the contents failing to meet a predetermined condition when generating the user preference information.

The recommending means may preferably include: determining means for determining whether or not the use frequency calculated by the calculating means is higher than a predetermined set value; and setting means for setting a staple flag indicating that the recommended contents have been viewed frequently to said content recommendation information if said use frequency is found higher than said predetermined set value by said determining means.

Preferably, the generating means may include extracting means for acquiring metadata about the contents constituting the groups of which the use frequency calculated by the calculating means is higher than a predetermined set value, the extracting means further extracting vectors representing an amount of characteristics of the metadata; and the generating means may generate the user preference information based on the vectors extracted by the extracting means.

Preferably, the generating means may include staple determining means for determining whether or not the contents constituting the groups of which the use frequency is found higher than the predetermined set value correspond to the content recommendation information to which is set a staple flag indicating that the recommended contents have been viewed frequently. If the staple determining means determines that the contents do not correspond to the content recommendation information carrying the set staple flag, then the extracting means may acquire the metadata about the contents and extract vectors representing an amount of characteristics of the metadata.

The user preference information may preferably be constituted by a plurality of attributes and by values representing degrees of importance of the attributes.

Preferably, the generating means may include familiarity setting means for setting degrees of familiarity with the contents based on the use frequency calculated by the calculating means; and the generating means may assign weights to degrees of importance of the user preference information based on the degrees of familiarity.

The generating means may preferably include: searching means for searching for contents of which the use frequency is lower than a predetermined value on the basis of a history of uses of the contents; and a special preference information generating means for generating special preference information based on metadata about the contents retrieved by the searching means.

Preferably, the inventive information processing apparatus may further include: first extracting means for extracting vectors representing an amount of characteristics of either the user preference information or the special preference information; second extracting means for acquiring metadata about the contents broadcast in a predetermined set time slot, and extracting vectors representing an amount of characteristics of the meta; and calculating means for calculating degrees of similarity between the vectors extracted by the first extracting means and those extracted by the second extracting means. Therefore, the recommending means may select a predetermined set number of the vectors extracted by the second extracting means, the vectors being selected in descending order of the degrees of similarity, the recommending means further giving content recommendations based on the metadata about the selected vectors.

According to another embodiment of the present invention, there is provided an information processing method including the steps of: organizing delivered contents into groups each constituted by the contents which are given the same group ID for having degrees of similarity higher than a predetermined value regarding a grouping item including at least one attribute item representative of a content attribute; calculating frequency of uses of the contents with respect to each of the group IDs; generating user preference information indicating preferences of a user based on the use frequency calculated in the calculating step; and giving content recommendations based on the user preference information generated in the generating step.

According to a further embodiment of the present invention, there is provided a recording medium which holds a program including the steps of: organizing delivered contents into groups each constituted by the contents which are given the same group ID for having degrees of similarity higher than a predetermined value regarding a grouping item including at least one attribute item representative of a content attribute; calculating frequency of uses of the contents with respect to each of the group IDs; generating user preference information indicating preferences of a user based on the use frequency calculated in the calculating step; and giving content recommendations based on the user preference information generated in the generating step.

According to an even further embodiment of the present invention, there is provided a program including the steps of: organizing delivered contents into groups each constituted by the contents which are given the same group ID for having degrees of similarity higher than a predetermined value regarding a grouping item including at least one attribute item representative of a content attribute; calculating frequency of uses of the contents with respect to each of the group IDs; generating user preference information indicating preferences of a user based on the use frequency calculated in the calculating step; and giving content recommendations based on the user preference information generated in the generating step.

Where the information processing apparatus, information processing method, and a program of the present invention are in use, delivered contents are first organized into groups each constituted by the contents which are given the same group ID for having degrees of similarity higher than a predetermined value regarding a grouping item including at least one attribute item representative of a content attribute. Then frequency of uses of the contents is calculated with respect to each of the group IDs. Based on the use frequencies thus calculated, user preference information indicating preferences of the user is generated. Content recommendations are then given on the basis of the generated user preference information.

BRIEF DESCRIPTION OF DRAWINGS

FIG. 3 is an explanatory view showing how contents are organized into groups.

FIG. 4 is another explanatory view showing how contents are organized into groups.

FIG. 6 is a schematic view showing a typical history of uses.

FIG. 10 is an explanatory view showing how use frequencies are calculated.

FIG. 11A is another explanatory view showing how use frequencies are calculated.

FIG. 11B is another explanatory view showing how use frequencies are calculated.

FIG. 12 is an explanatory view showing how use status is verified.

FIG. 13 is another explanatory view showing how use status is verified.

FIG. 14 is another explanatory view showing how use status is verified.

FIG. 16 is a schematic view showing a typical display of content recommendation information.

FIG. 17 is a schematic view showing another typical display of content recommendation information.

FIG. 24 is a schematic view showing how program vectors are typically structured.

FIG. 25 is a schematic view showing how preference information is typically structured.

BEST MODE FOR CARRYING OUT THE INVENTION

Figure 1:
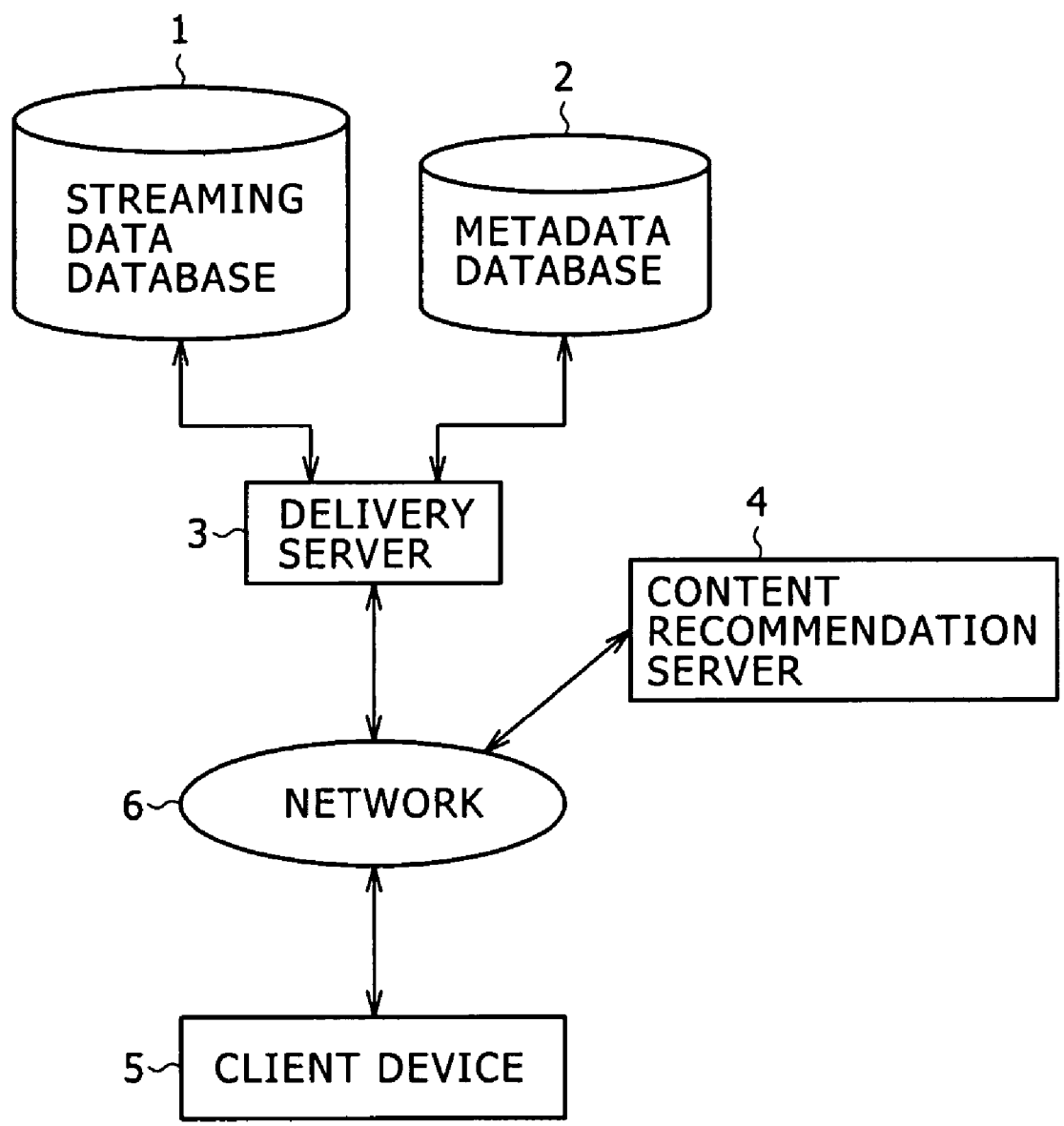
FIG. 1 is a schematic view showing a typical configuration of a content recommendation system to which this invention is applied.

FIG. 1 is a schematic view showing a typical configuration of a content recommendation system to which this invention is applied. In FIG. 1, a delivery server 3 acquires streaming data from a streaming data database 1 and delivers the acquired data to client devices 5 via a network 6 such as the Internet or some other suitable network. The delivery server 3 also obtains metadata about contents from a metadata database 2 and supplies the obtained data to a content recommendation server 4 via the network 6.

Figure 2:
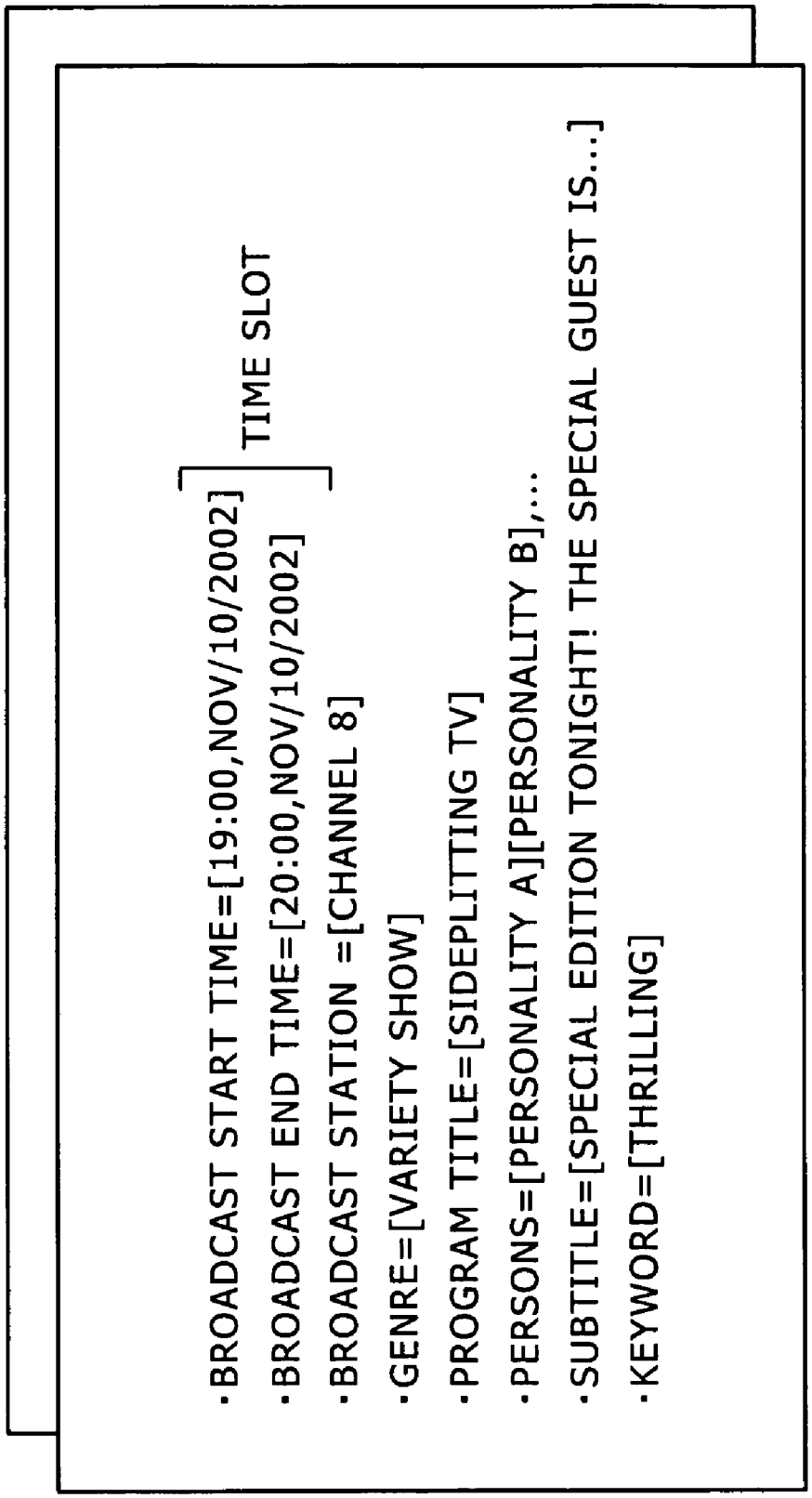
FIG. 2 is a schematic view showing typical metadata.

The metadata, as shown in FIG. 2, is made up of items representing content attributes, such as "broadcast start time", "broadcast end time", "broadcast station", "genre", "title", "persons", "subtitle", and "keyword".

With regard to a grouping item including at least one such attribute item, the content recommendation server 4 furnishes the same group ID to the contents whose constituent items (i.e., those making up the grouping item) have degrees of similarity (i.e., values indicating degrees of partial or total coincidence or similarity between the constituent items of each attribute item) which are higher than a predetermined value; the similar contents are thus organized into the same group.

Where there is a grouping item formed by metadata items "broadcast station", "broadcast start time" and "broadcast end time", the same group ID is attached to the contents which may be broadcast illustratively on channel 8 (broadcast station) between 00:00 (broadcast start time) and 06:00 (broadcast end time).

With the grouping item above in effect, as shown in FIG. 3, the contents are grouped for each of combinations of the constituent items "broadcast station", "broadcast start time" and "broadcast end time" making up the grouping item.

Where there is a grouping item formed by metadata items "genre" and "persons", the same group ID is attached to the contents which may illustratively be variety shows (as genre) featuring a personality A (as persons).

With the foregoing grouping item in effect, as shown in FIG. 4, the contents are grouped for each of combinations of the constituent items "genre" and "persons" making up the grouping item.

If there exist a plurality of grouping items, one content may belong to a plurality of groups depending on the items of the content. For example, the program which is broadcast on channel 8 between 00:00 and 06:00 as a variety show featuring the personality A belongs to two groups: one group with a group ID (see FIG. 3) for identifying the program broadcast on channel 8 between 00:00 (broadcast start time) and 06:00 (broadcast end time), and the other group with a group ID (see FIG. 4) for indicating the program which is a variety show (genre) featuring the personality A (persons).

Figure 5:
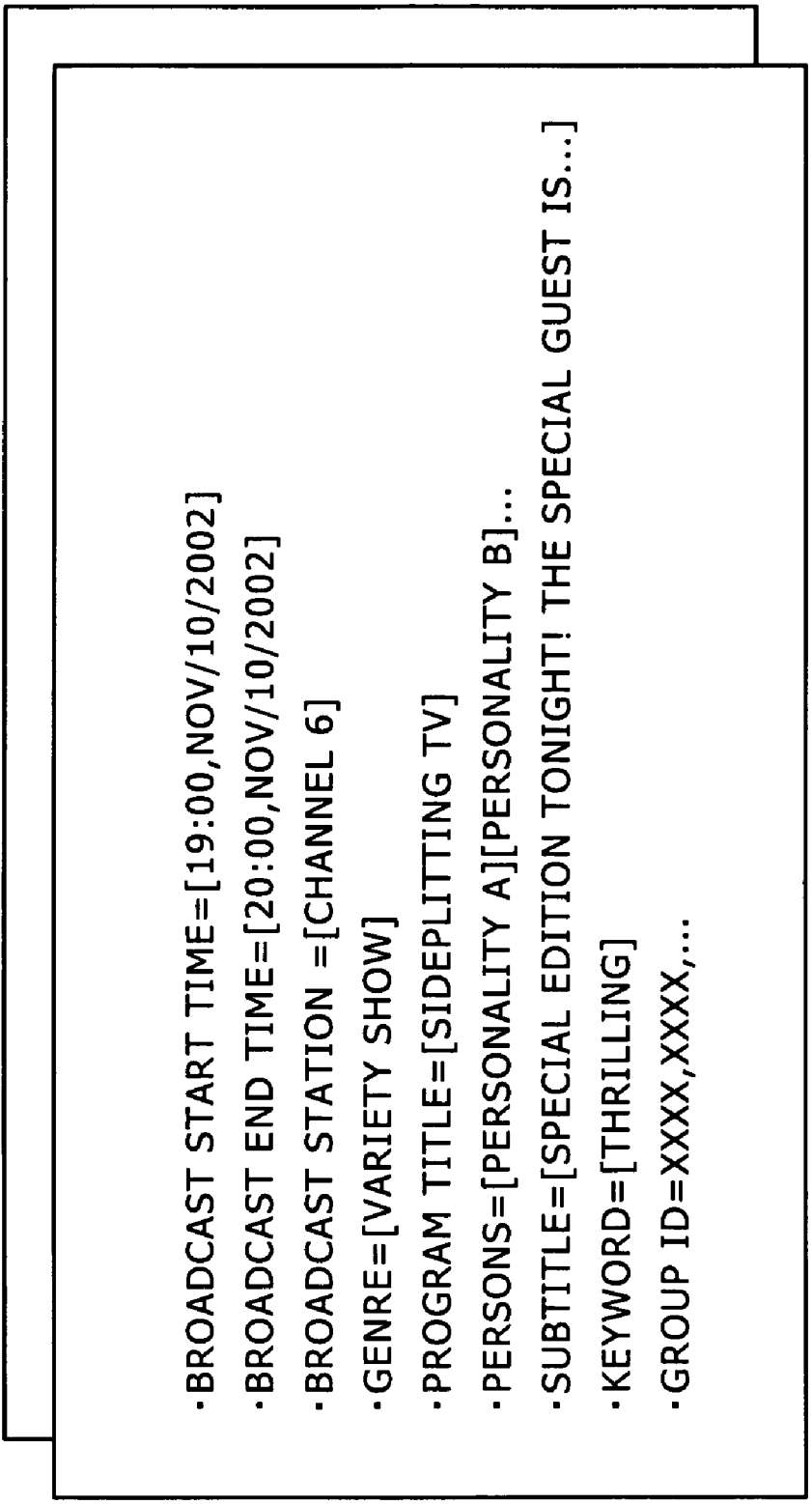
FIG. 5 is a schematic view showing typical metadata furnished with group IDs.

From time to time, the content recommendation server 4 sends to the client device 5 the metadata carrying the group IDs set as outlined above (e.g., see FIG. 5).

The content recommendation server 4 further acquires from the client device 5 a history of uses including the group IDs of the contents. Based on the use history acquired, the content recommendation server 4 calculates the frequency of uses for each group. The content recommendation server 4 utilizes the calculated use frequencies for indicating the user's preferences, thereby giving content recommendations per group. Illustratively, information about the contents belonging to groups with high use frequencies is transmitted to the client device 5 as content recommendation information.

In using the contents sent from the delivery server 3, the client device 5 may supply the content recommendation server 4 with a history of content uses, such as metadata about the used contents (i.e., data carrying group IDs) as shown in FIG. 6.

In turn, the client device 5 presents the user with the content recommendation information supplied from the content recommendation server 4. By referring to the presented recommendation information, the user can select contents that match his or her preferences.

Communications between the delivery server 3 and the client device 5 are conducted over the network 6. Alternatively, the delivery server 3 and client device 5 may communicate with one another directly.

Figure 7:
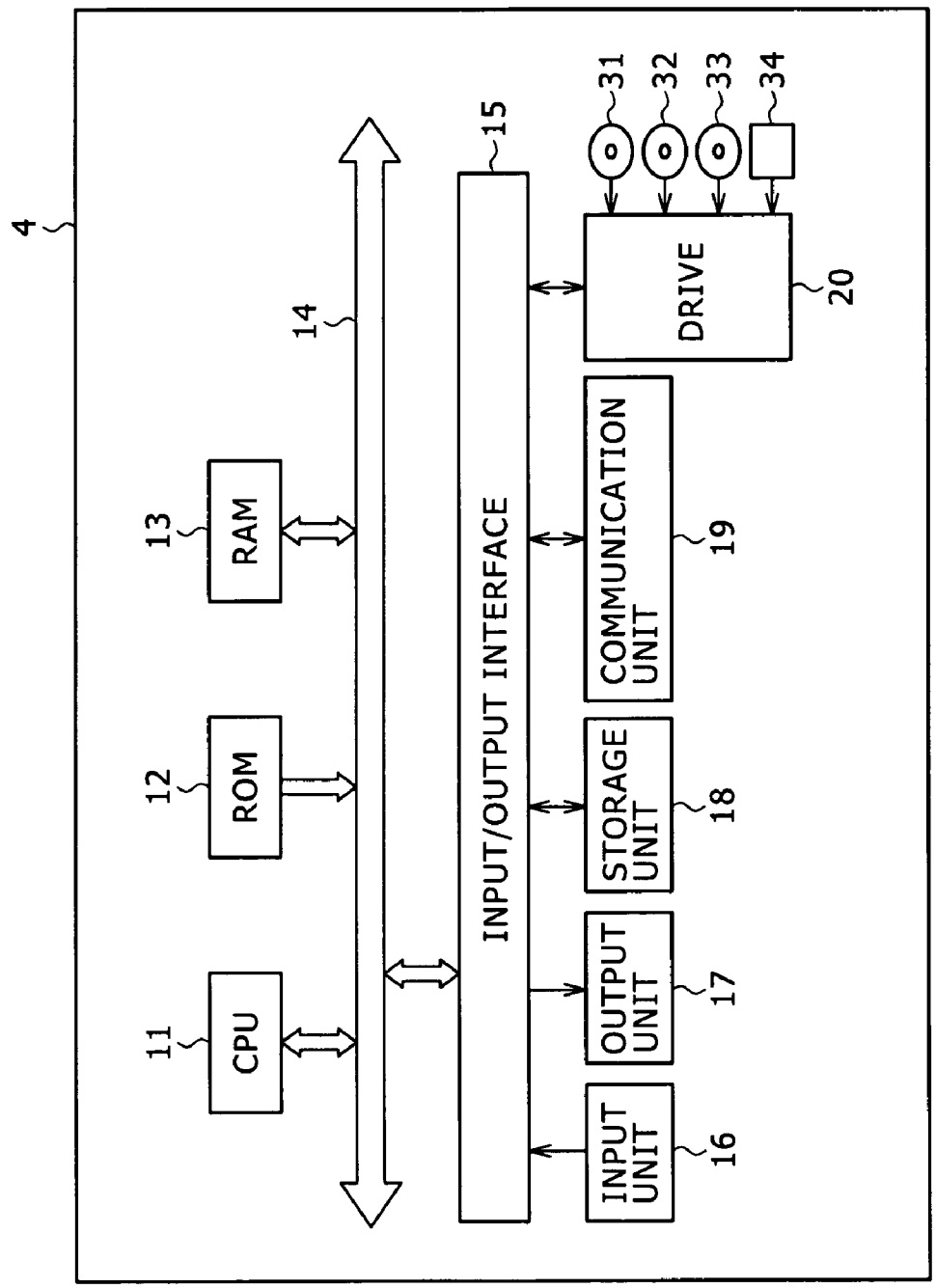
FIG. 7 is a block diagram showing a typical structure of a content recommendation server included in FIG. 1.

FIG. 7 is a block diagram showing a typical structure of the content recommendation server 4. A CPU (Central Processing Unit) 11 performs processes in accordance with content recommendation programs or other suitable programs held in a ROM (Read Only Memory) 12. A RAM (Random Access Memory) 13 retains data needed by the CPU 11 in carrying out its processing.

The CPU 1 is connected with an input/output interface 15 via a bus 14. The input/output interface 15 is connected with an input unit 16 made of a keyboard and a mouse, an output unit 17 formed by a liquid-crystal display (LCD) or similar equipment, a storage unit 18 for storing metadata and others, and a communication unit 19 for communicating with the delivery server 3 or client device 5 via the network 6.

A drive 20 is connected as needed to the input/output interface 15. The CPU 11 writes and reads data to and from a magnetic disk 31, an optical disk 32, a magneto-optical disk 33, or a semiconductor memory 34 loaded into the drive 20.

As an alternative, the CPU 11 may be structured with three units: a preference information acquisition unit for acquiring users' preference information, a metadata acquisition unit for acquiring metadata about TV programs sent from the delivery server 3, and a recommendation information generation unit for generating recommendation information about contents.

Figure 8:
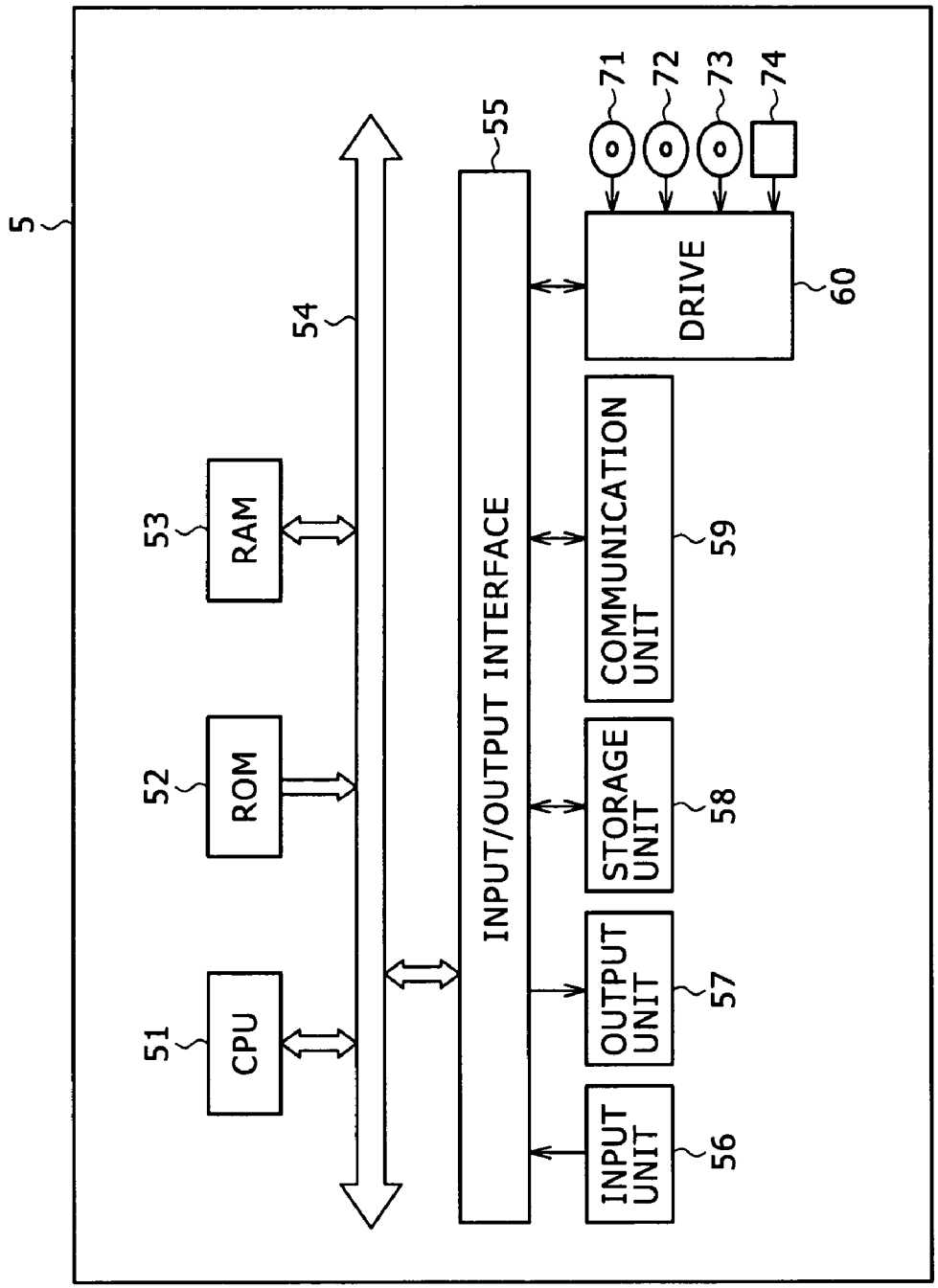
FIG. 8 is a block diagram showing a typical structure of a client device included in FIG. 1.

FIG. 8 is a block diagram showing a typical structure of the client device 5. This structure is basically the same as that of the content recommendation server 4 and thus will not be discussed further.

Figure 9:
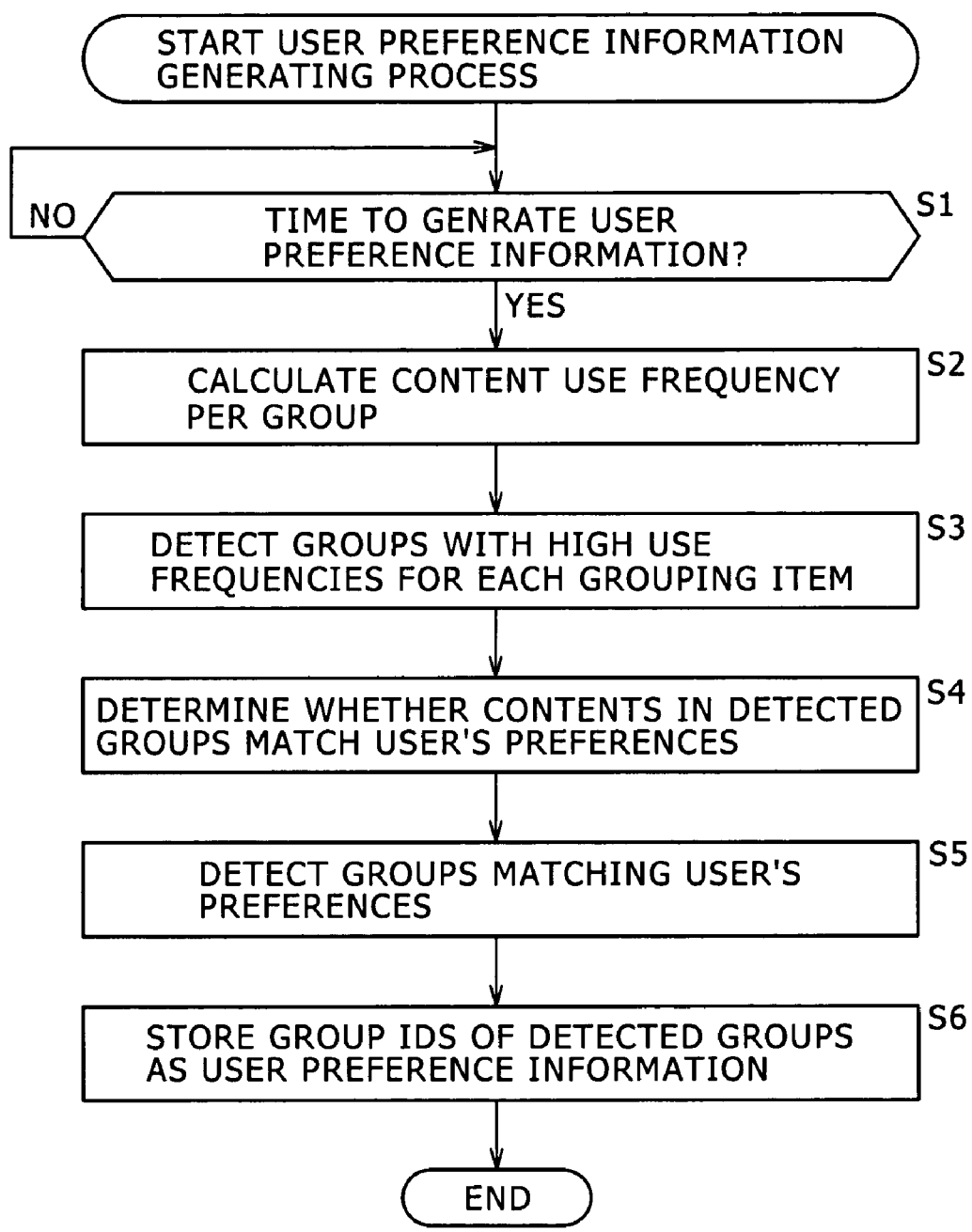
FIG. 9 is a flowchart of steps constituting a user preference information generating process.

Described below with reference to the flowchart of FIG. 9 is how the content recommendation server 4 works when generating user preference information.

In step S1, the CPU 11 of the content recommendation server 4 determines whether or not it is time to generate user preference information. If the timing is found to be, right, step S2 is reached. More specifically, step S2 is reached if a request for content recommendation information (to be explained later) has arrived from the client device 5 or if a predetermined point in time (e.g., a fixed time of day every week) has been reached.

In step S2, the CPU 11 acquires a history of uses from the client device 5 via the communication unit 19. In this example, metadata (carrying group IDs) about the contents that were used during the past week is acquired. The CPU 11 calculates the frequency of content uses per group.

Where there is furnished a grouping item including constituent items "broadcast station", "broadcast start time" and "broadcast end time", the metadata is provided with the group IDs corresponding to what is contained in the grouping item (i.e., combinations of the constituent items making up the grouping item). As shown in FIG. 10, the frequency of content uses (i.e., number of times each content has been used) is calculated for each of the combinations of the constituent items making up the grouping item.

The use frequency per group shown in FIG. 10 is as follows: the program broadcast on channel 8 between 20:00 and 21:00 and the program broadcast on channel 10 between 19:00 and 20:00 were most often viewed (seven times each) The next lower in viewing rank is the program broadcast on channel 8 between 22:00 and 23:00 (six times).

Where there is furnished a grouping item including constituent items "genre" and "persons", the metadata is likewise provided with the group IDs corresponding to what is contained in the grouping item (i.e., combinations of the constituent items making up the grouping item). As shown in FIG. 11A, the frequency of content uses (i.e., number of times each content has been used) is calculated similarly for each of the combinations of the constituent items making up the grouping item.

The use frequency per group shown in FIG. 11A is as follows: programs featuring a personality D were most often watched (ten times). The second-most watched are news programs in which the personality D appeared (eight times). The next lower in viewing rank are variety shows featuring a personality C (five times).

The use frequencies can become disproportionately higher the larger the number of contents that have been delivered. In that case, the frequencies may not accurately reflect the user's preferences. This bottleneck is circumvented by normalizing the use frequencies using the number of contents delivered during the time period corresponding to the use history acquired in step S2 above.

Illustratively, suppose that in the example of FIG. 11, ten variety shows were delivered (over the week) featuring the personality D, that 100 news programs were delivered with the personality D appearing during the same week; and that 80 variety shows featuring the personality C were delivered during the same period. In such a case, the use frequencies in FIG. 11A are normalized as shown in FIG. 11B. The normalization turns the use frequencies into those reflecting the user's preferences more accurately.

In step S3 back in FIG. 9, the CPU 11 of the content recommendation server 4 detects groups (i.e., their group IDs) with use frequencies higher than a predetermined threshold value for each grouping item.

For example, suppose that the threshold value is set to 7 for a grouping item including constituent items "broadcast station", "broadcast start time" and "broadcast end time". In that case, the CPU 11 detects two groups: a "channel 8 between 20:00 and 21:00" group, and a "channel 10 between 19:00 and 20:00" group.

Suppose now that the threshold value is set to 0.06 for a grouping item including constituent items "genre" and "persons". If that is the case, the CPU 11 in the example of FIG. 11B detects three groups: a "variety, personality D" group, a "news, personality D" group, and a "variety, personality C" group.

In step S4, the CPU 11 determines whether or not the contents in each of the groups detected in step S3 match the user's preferences.

Illustratively, a check is made on the list of delivered contents belonging to a given group to see whether or not its contents were not viewed a predetermined number of times consecutively (e.g., three times). If the contents were found not watched the predetermined number of times in a row, the contents in that group are found failing to match the user's preferences.

As shown in FIG. 13, if the programs in the "variety, personality D" group were not viewed three times in a row, then the contents of that group are found failing to suit the user's preferences.

Suppose that as shown in FIG. 12, the most recent program A in the "channel 8 between 20:00 and 21:00" group was not watched but the program delivered prior to that program was viewed (i.e., not passed up three times consecutively). In that case, the contents in the "channel 8 between 20:00 and 21:00" group are not found failing to match the user's preferences (i.e., they are matched to the user's preferences).

Alternatively, as shown in FIG. 14, if the contents in a given group were found watched a predetermined number of times in a row (e.g., three times), then the contents in that group may be found matching the user's preferences.

In step S5 the CPU 11 detects groups made up of the contents matching the user's preferences on the basis of what was determined in step S4.

In step S6, the CPU 11 stores the group IDs of the groups detected in step S5 into the storage unit 18 as user preference information.

More specifically, what is stored into the storage unit 18 as the user preference information in the case above is constituted by the group IDs of the "channel 8 between 20:00 and 21:00" group and the "channel 10 between 19:00 and 20:00" group with respect to the grouping item including the constituent items "broadcast station", "broadcast start tine" and "broadcast end time"; and by the group IDs of the "news, personality D" group and the "variety, personality C" group regarding the group item including the constituent items "genre" and "persons".

Figure 15:
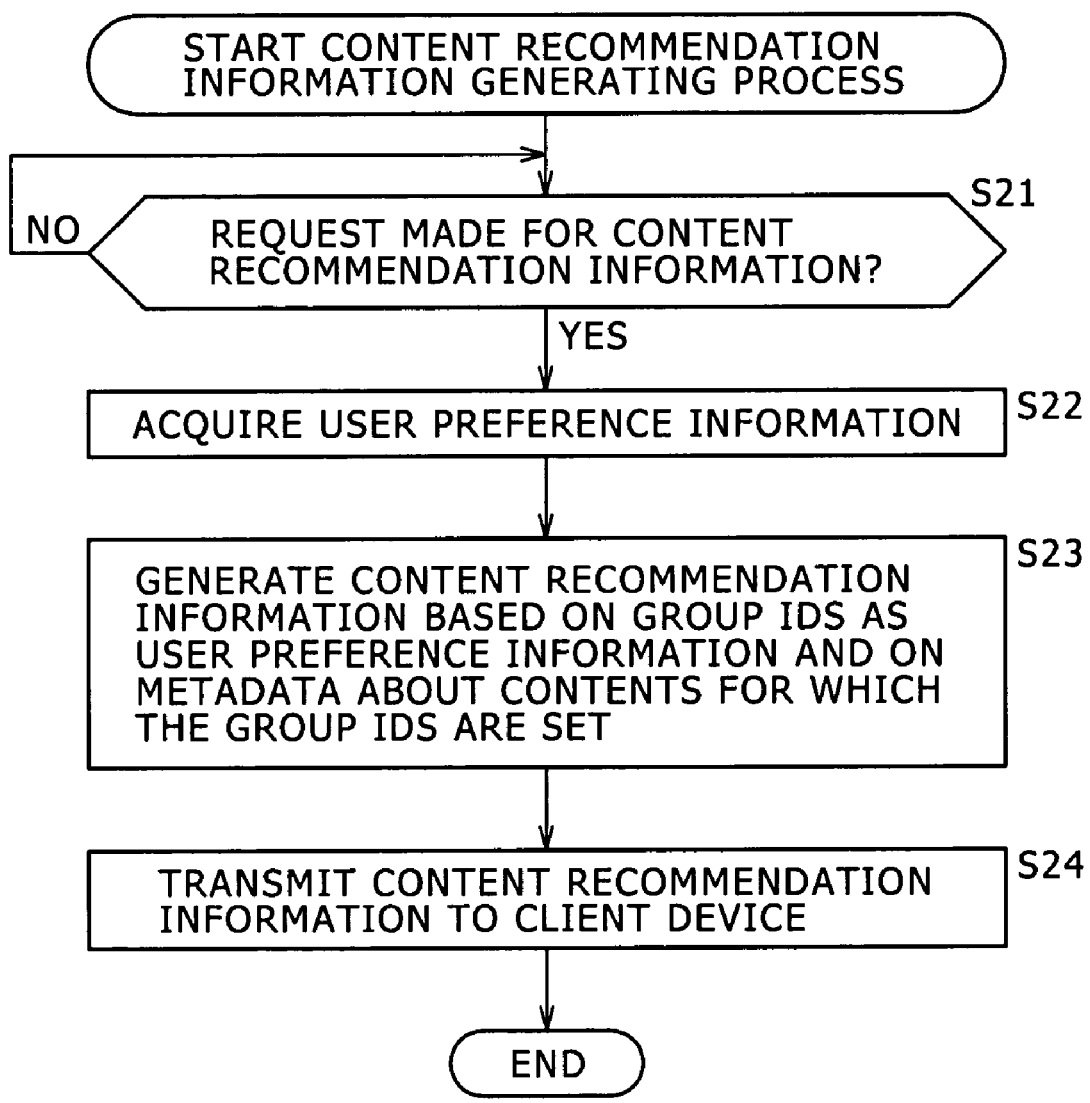
FIG. 15 is a flowchart of steps constituting a content recommendation information generating process.

Described below with reference to the flowchart of FIG. 15 is how the content recommendation server 4 works when generating content recommendation information.

In step S21, the CPU 11 of the content recommendation server 4 waits for a request for content recommendation information from the client device 5. When the request is detected, step S22 is reached. In step S22, the CPU 11 acquires from the storage unit 18 the user preference information generated as described above.

In step s23, from the metadata (carrying group IDs) on the contents about to be delivered, the CPU 11 extracts metadata carrying the same group IDs as those of the user preference information. From the extracted metadata, the CPU 11 generates content recommendation information.

If there exist a plurality of group IDs stored as the user preference information, the CPU 11 may extract metadata about the contents to which all of these group IDs are attached.

In step S24, the CPU 11 transmits the content recommendation information generated in step S23 to the client device 5 via the communication unit 19. In turn, the client device 5 causes the output unit 57 to display the content recommendation information sent from the content recommendation server 4.

FIGS. 16 and 17 are schematic views showing typical displays of content recommendation information. The example of FIG. 16 shows information (titles, etc.) about the programs belonging to the "channel 8 between 20:00 and 21:00" group and "channel 10 between 19:00 and 20:00" group with respect to the grouping item formed by the constituent items "broadcast station", "broadcast start time" and "broadcast end time".

The example of FIG. 17 indicates information (titles, etc.) about the programs belonging to the "news, personality D" group and "variety, personality C" group regarding the grouping item made up of the constituent items "genre" and "persons". Windows showing the information about the programs of different groups may be displayed in imbricate fashion depending on the size of the screen in use, as shown in FIG. 17. The user can refer to the content recommendation information thus displayed when selecting desired programs to watch.

In the manner described, the use frequencies serving as the basis for grasping the user's preferences are calculated for each of the groups based on their group IDs. The calculations in that case are significantly less in quantity than if use frequencies were computed for each metadata item.

Because the content recommendation information is displayed on a group-by-group basis, it is possible to display the information properly even on a client device 5 having a limited display space.

Although the foregoing description showed contents to be grouped by such metadata items as "broadcast station", "broadcast start time", "broadcast end time", "genre" and "persons", this is not limitative of the invention. Other items such as "title" and "detail" may also be used for the grouping process. Consequently, reruns and special versions as opposed to the original programs can be handled as contents that belong to the same group as that of the originals. In other words, whether or not a given program is an original program or a rerun, the history of its use, once the program has been viewed, is reflected in generating user preference information.

Figure 18:
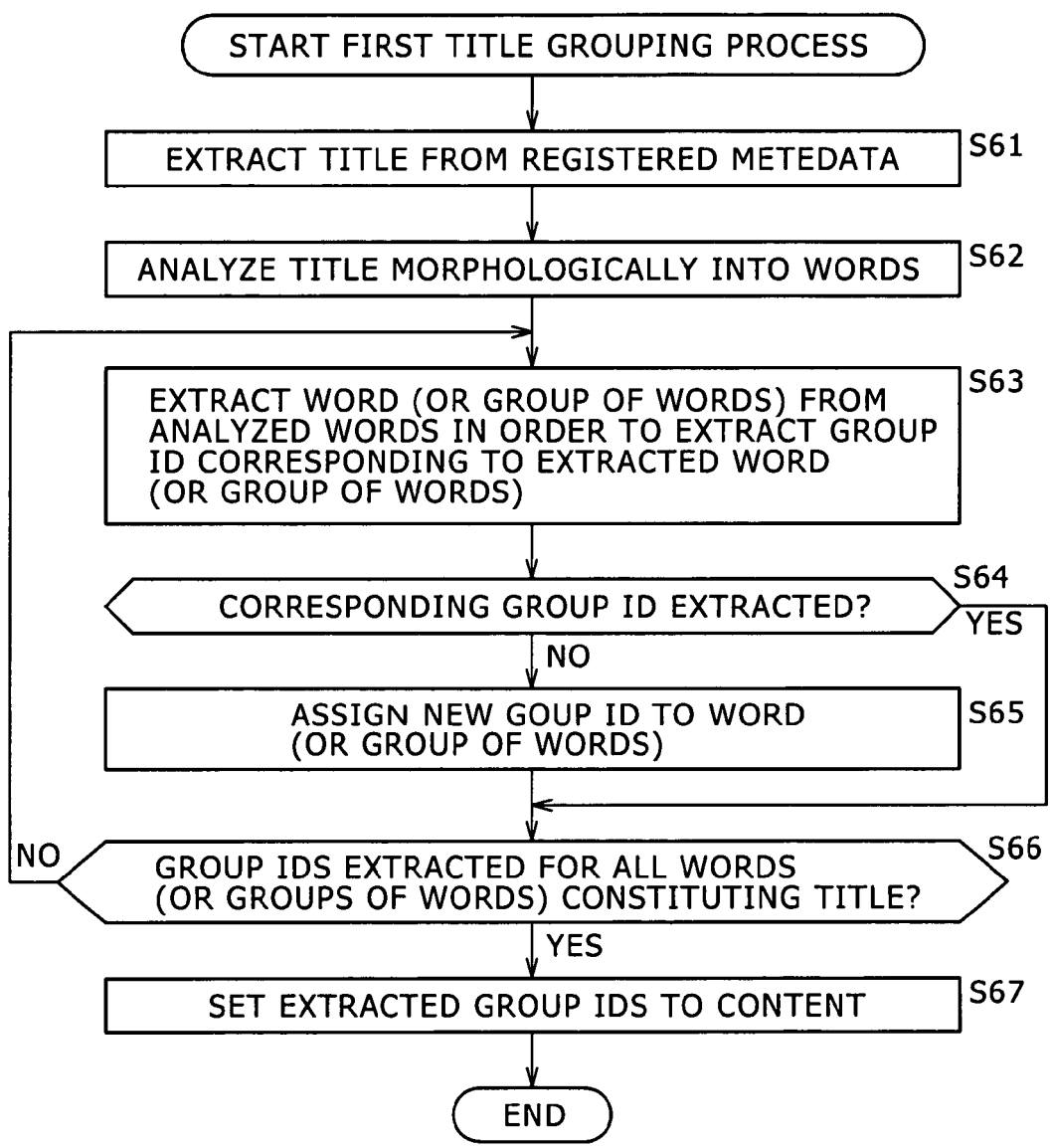
FIG. 18 is a flowchart of steps constituting a first title grouping process.

Described below with reference to the flowchart of FIG. 18 is a first title grouping process whereby contents are grouped through the use of the item "title".

In step S61, the content recommendation server 4 extracts a title from metadata.

In step S62, the content recommendation server 4 analyzes the extracted title morphologically into words. For example, if a movie title "TOKAIDO-MITSUYA-KAIDAN" is included in the metadata, the title may be extracted and morphologically analyzed into three words: TOKAIDO, MITSUYA, and KAIDAN.

In step S63, the content recommendation server 4 extracts one of the analyzed words or groups of words, and retrieves from the storage unit 18 a group ID corresponding to the extracted word or group of words.

Groups of words in this context are those generated as combinations of the words derived from the morphological analysis. Illustratively, if the words TOKAIDO, MITSUYA and KAIDAN are obtained by the morphological analysis, then three combinations TOKAIDO-MITUYA, TOKAIDO-KAIDAN and MITSUYA-KAIDAN are acquired as the analyzed groups of words.

In step S64, the content recommendation server 4 determines whether or not a corresponding group ID has been extracted.

If in step S64 no corresponding group ID is found extracted, that means the extracted word or group of words is not yet furnished with a group ID. In that case, step S65 is reached. In step S65, a new group ID is assigned to the extracted word or group of words. The content recommendation server 4 stores the extracted word or group of words in association with the corresponding group ID.

If in step S64 the corresponding group ID is found extracted, or after the process of step S65 is completed, step S66 is reached. In step S66, the content recommendation server 4 determines whether or not group IDs have been extracted for all words or all groups of words making up the title.

If in step S66 the group IDs are not found to extract for all words or all groups of words constituting the title, then step S63 is reached again and the subsequent steps are repeated.

If in step S66 the group IDs are found to have extracted for all words or all groups of words composing the title, step S67 is reached. In step S67, the content recommendation server 4 associates the extracted or assigned group IDs with the metadata, and terminates the processing.

It is possible to put programs having similar titles into the same group. For example, a serial TV drama titled "2-NEN-A-GUMI-GINPACHI-SENSEI" and a special program titled "2-NEN-A-GUMI-GINPACHI-SENSEI-SPECIAL" may be placed into the same group. Based on the morphologically analyzed words making up each title, programs may be placed into the same group after their titles are checked over a predetermined period of time (two weeks, one month, six months, etc.) for coincidence in round-robin matches between the analyzed words.

Figure 19:
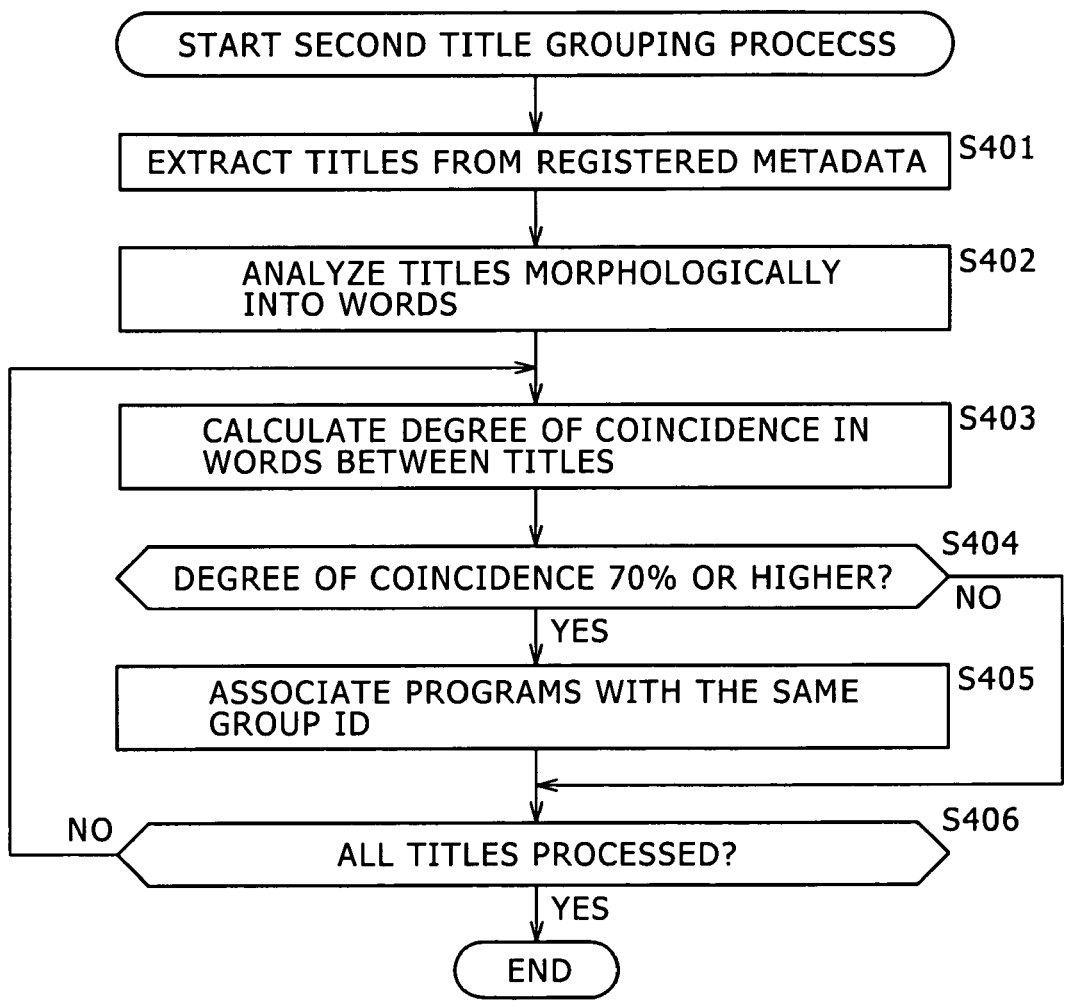
FIG. 19 is a flowchart of steps constituting a second title grouping process.

Described below with reference to the flowchart of FIG. 19 is a second title grouping process whereby contents are grouped on the basis of degrees of coincidence between the words making up their titles (i.e., grouping process with respect to the grouping item formed by the constituent item "title").

In steps S401 and S402, the same processes as those in steps S61 and S62 are carried out as discussed above with reference to FIG. 18. That is, the content recommendation server 4 extracts titles from metadata and analyzes the extracted titles morphologically into words.

In step S403, based on the analyzed words, the content recommendation server 4 calculates the degree of coincidence between the titles in terms of their component words.

More specifically, suppose that the title "2-NEN-A-GUMI-GINPACHI-SENSEI" is analyzed morphologically into "2", "NEN", "A", "GUMI", "GINPACHI" and "SENSEI" and the title "2-NEN-A-GUMI-GINPACHI-SENSEI-SPECIAL" into "2", "NEN", "A", "GUMI", "GINPACHI", "SENSEI" and "SPECIAL". In that case, 6/7 or 85.7 % of the words constituting the titles of the two programs are found to coincide with one another.

In step S404, the content recommendation server 4 determines whether or not the analyzed words have the degree of coincidence of, say, at least 70%. Obviously the threshold value of coincidence may alternatively be any value other than 70%.

If in step S404 at least 70 % or any other predetermined percentage of the words are found to coincide with one another, step S405 is reached. In step S405, the content recommendation server 4 associates the programs having these titles with the same group ID. The content recommendation server 4 then stores the matching words or groups of words in association with the corresponding group ID.

If in step S404 less than 70 % or any other predetermined percentage of the words are found to coincide, or after the process of step S405 is finished, step S406 is reached. In step S406, the content recommendation server 4 determines whether or not all titles have been processed on a round-robin basis.

If in step S406 all titles are not found to have processed in round-robin fashion, then step S403 is reached again and the subsequent steps are repeated. If all titles are found to have processed in step S406, the content recommendation server 4 terminates the processing.

As described, programs are furnished with relevant group IDs based on the degree of coincidence between the words constituting their titles. Illustratively, a serial TV drama and a special program both titled similarly may be put into the same group.

When programs are organized into groups based on the degree of coincidence between the words making up their titles, it is possible to pass up small variations in metadata notations during the grouping process. For example, programs having the same titles can be detected as those belonging to the same group regardless of their respective titles being noted in half-size or full-size numerals or alphabetic characters or in upper-case or lower-case alphabetic characters.

In addition to the degree of coincidence, another grouping condition may be established such as broadcast station, genre, or broadcast start time. For example, because news programs are each titled typically using a small number of words including the word "news", the process of FIG. 19 could mistakenly detect news programs in different formats from different broadcast stations as those belonging to the same group for their similar titles. This snag is circumvented by putting programs into the same group only if they are found to be from the same broadcast station in addition to the higher-than-threshold degree of coincidence between the words making up their titles.

Figure 20:
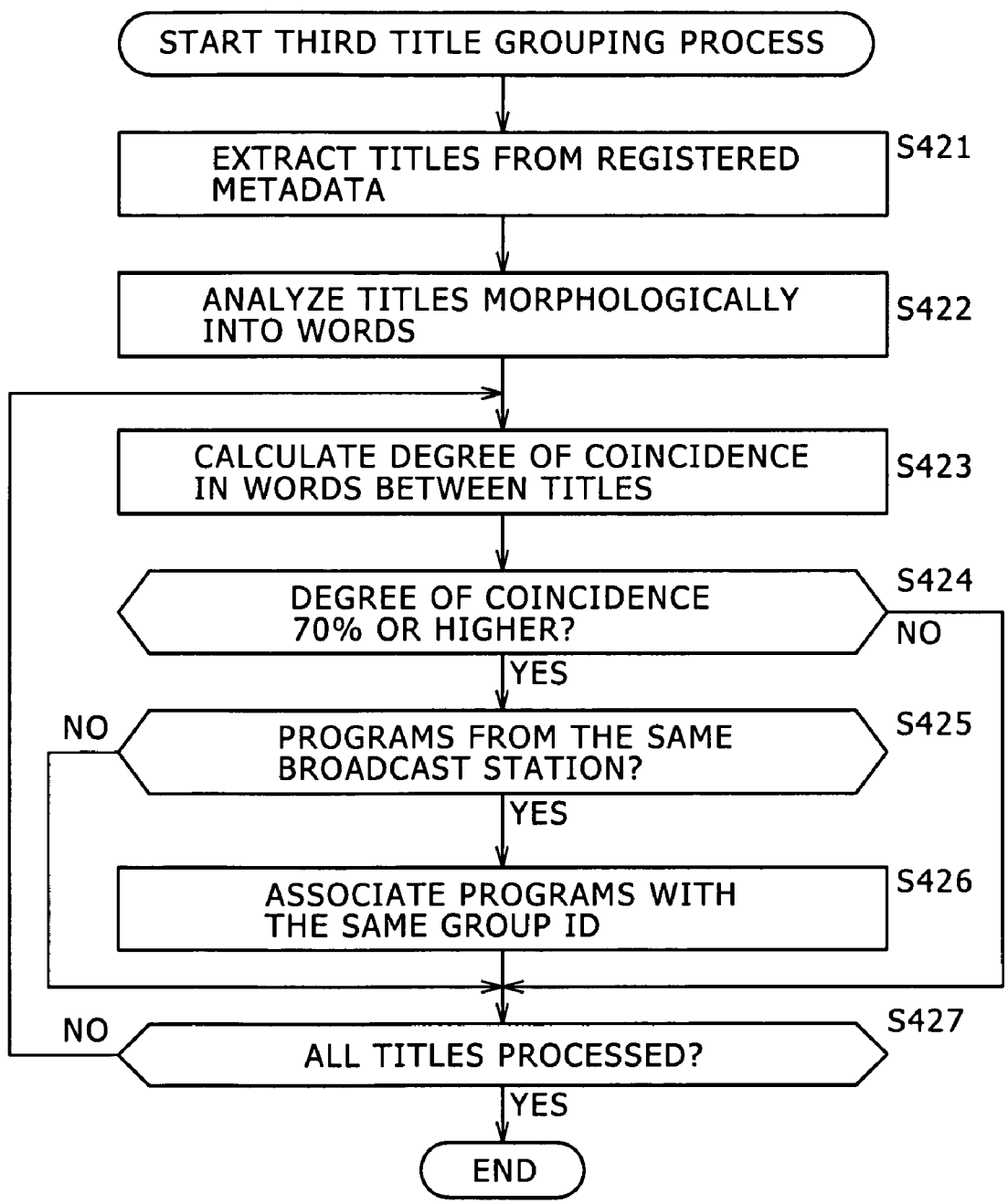
FIG. 20 is a flowchart of steps constituting a third title grouping process.

Described below with reference to the flowchart of FIG. 20 is a third title grouping process whereby contents are grouped on the basis of coincidence of the broadcast stations they are sent from, in addition to the degree of coincidence between the words making up their titles (i.e., grouping process with respect to the grouping item formed by the constituent items "title" and "broadcast station").

In steps S421 through S424, the same processes as those in steps S401 through S404 are carried out as discussed above with reference to FIG. 19. That is, the content recommendation server 4 extracts titles from metadata and analyzes the extracted titles morphologically into words. Based on the analyzed words, the content recommendation server 4 calculates the degree of coincidence between the titles in terms of their component words. The content recommendation server 4 then determines whether or not the analyzed words have the degree of coincidence of at least 70 % or any other predetermined threshold value.

If in step S424 at least 70 % or any other predetermined percentage of the words are found to coincide with one another, step S425 is reached. In step S425, the content recommendation server 4 determines whether or not the programs carrying the analyzed titles are sent from the same broadcast station.

If in step S425 the programs are found to be from the same broadcast station, step S426 is reached. In step S426, the content recommendation server 4 associates these programs with the same group ID. The content recommendation server 4 then stores the matching words or groups of words in association with the corresponding broadcast station and group ID.

If in step S424 less than 70 % or any other predetermined percentage of the words are found to coincide, if in step S425 the programs are not found to be from the same broadcast station, or after the process of step S426 is finished, step S427 is reached. In step S427, the content recommendation server 4 determines whether or not all titles have been processed on a round-robin basis.

If in step S427 all titles are not found to have processed in round-robin fashion, then step S423 is reached again and the subsequent steps are repeated. If all titles are found to have processed in step S427, the content recommendation server 4 terminates the processing.

As described, programs are associated with relevant group IDs based on the matching broadcast station and on the degree of coincidence between the words constituting their titles. For example, when similarly titled programs are subject to the grouping process, a news program from one broadcast station and another news program from a different broadcast station will not be placed into the same group.

The process of FIG. 20 was described as one which organizes programs into groups based on whether or not they are from the same broadcast station, in addition to whether or not at least a predetermined percentage of the words constituting their titles coincide. As another alternative, the grouping process may obviously be carried out on the basis of whether or not the programs are in the same broadcast time slot, in the same genre, etc., in addition to whether or not at least a predetermined degree of coincidence is detected between the words making up their titles.

Furthermore, it might happen that the broadcast start time of a serial TV drama or a daily program in a fixed time slot is shifted because a live telecast of sports has been prolonged or a special program has been inserted. In such a case, the program in question may still be detected as belonging to the same group if its broadcast start time is found to match the original time within a predetermined time divergence such as within a one-hour margin, in addition to the confirmation that at least a predetermined percentage of the words making up the program title coincide with the analyzed words of the group.

Figure 21:
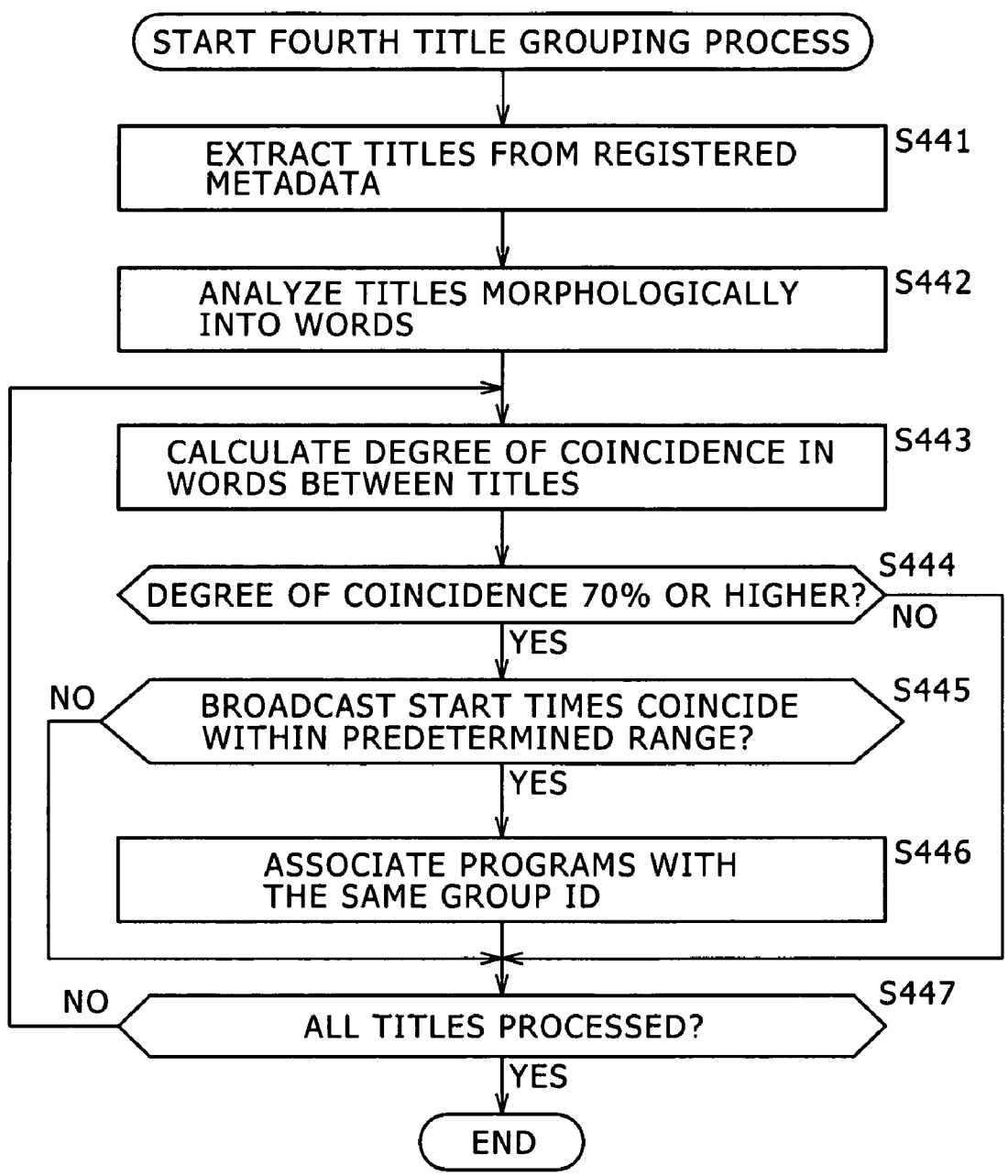
FIG. 21 is a flowchart of steps constituting a fourth title grouping process.

Described below with reference to the flowchart of FIG. 21 is a fourth title grouping process whereby contents are grouped on the basis of whether or not their broadcast start times are shifted from the original times within a predetermined time divergence, in addition to whether or not at least a predetermined percentage of the words making up their tiles coincide (i.e., grouping process with respect to the grouping item formed by the constituent items "title" and "broadcast start time").

In steps S441 through S444, the same processes as those in steps S401 through S404 are carried out as discussed above with reference to FIG. 19. That is, the content recommendation server 4 extracts titles from metadata and analyzes the extracted titles morphologically into words. Based on the analyzed words, the content recommendation server 4 calculates the degree of coincidence between the titles in terms of their component words. The content recommendation server 4 then determines whether or not the analyzed words have the degree of coincidence of at least 70 % or any other predetermined threshold value.

If in step S444 at least 70 % or any other predetermined percentage of the words are found to coincide, step S445 is reached. In step S445, the content recommendation server 4 determines whether or not the broadcast start times of the programs carrying the analyzed titles coincide with the original times within the predetermined time divergence of, say, one hour.

If in step S445 the broadcast start times of the programs are found to coincide within the predetermined time divergence, then step S446 is reached. In step S446, the content recommendation server 4 associates these programs with the same group ID. The content recommendation server 4 then stores the matching words or groups of words in association with the corresponding broadcast start time divergence and group ID.

If in step S444 less than 70 % or any other predetermined percentage of the words are found to coincide, if in step S445 the programs are found to be shifted beyond the predetermined time divergence, or after the process of step S446 is finished, step S447 is reached. In step S447, the content recommendation server 4 determines whether or not all titles have been processed on a round-robin basis.

If in step S447 all titles are not found to have processed in round-robin fashion, then step S443 is reached again and the subsequent steps are repeated. If all titles are found to have processed in step S447, the content recommendation server 4 terminates the processing.

As described, programs are associated with relevant group IDs based on the matching broadcast start time divergences and on the degree of coincidence between the words constituting their titles. For example, when similarly titled programs are subject to the grouping process, specially inserted programs or other programming disruptions will not prevent the programs that should be put in the same group from getting thus grouped.

In the above examples, the content recommendation server 4 was shown performing the user preference information generating process (of FIG. 9) and content recommendation information generating process (of FIG. 15). As another alternative, the client device 5 may generate user preference information by calculating the use frequencies for each of the groups using metadata (i.e., grouping information) carrying the group IDs supplied from the content recommendation server 4. The client device 5 may then utilize the user preference information thus generated as the basis for creating content recommendation information.

Figure 22:
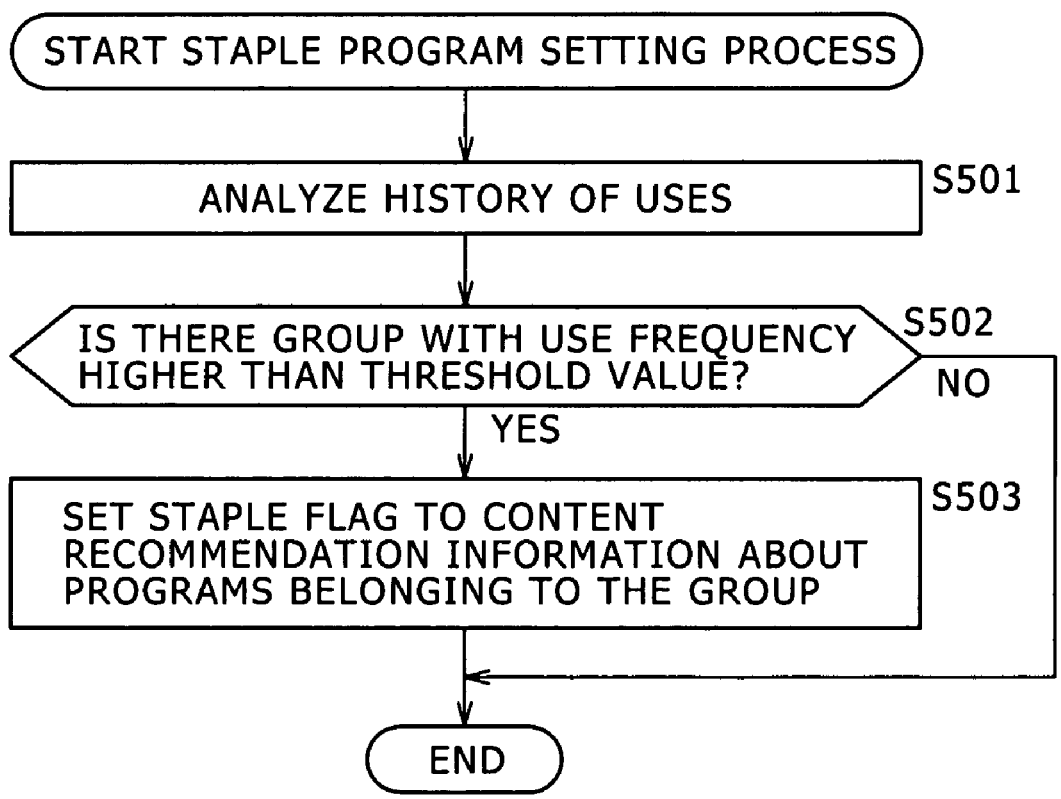
FIG. 22 is a flowchart of steps constituting a staple program setting process.

As a further alternative, it is possible to recommend frequently viewed programs as staple programs that may be automatically recorded unattended or turned on for viewing by the user. A typical staple program setting process will now be described with reference to FIG. 22. This process is carried out by the content recommendation server 4 prior to execution of the content recommendation information generating process discussed above with reference to FIG. 15.

In step S501, the CPU 11 analyzes a history of uses. In this step, as in step S2 of FIG. 9, the CPU 11 acquires from the client device 5 metadata (carrying group IDs) about the contents used over a predetermined period of time, and analyzes the acquired data for use frequencies of each of the groups (FIG. 10) or for their normalized use frequencies (FIG. 11B).

In step S502, the CPU 11 determines whether or not there is any group whose use frequency (i.e., viewing frequency) has exceeded a predetermined threshold value. If any such group is found to exist, step S503 is reached. In step S503, the CPU 11 sets a staple flag to the content recommendation information about the programs (whose use frequencies exceed the predetermined threshold value) belonging to that group, the staple flag indicating that the programs are a staple program each.

If in step S502 the CPU 11 finds any group with its viewing frequency exceeding the threshold value, the staple flag may alternatively be attached in step S503 to the content recommendation information about the programs belonging to the group.

If in step S502 the CPU 11 finds no group with its viewing frequency higher than the threshold value, the CPU 11 terminates the processing.

The content recommendation information to which the staple flag is attached as described above is transmitted to the client device 5 during the content recommendation information generating process of FIG. 15. This allows the client device 5 illustratively to make automatic recording of programs corresponding to the content recommendation information carrying the staple flag.

Figure 23:
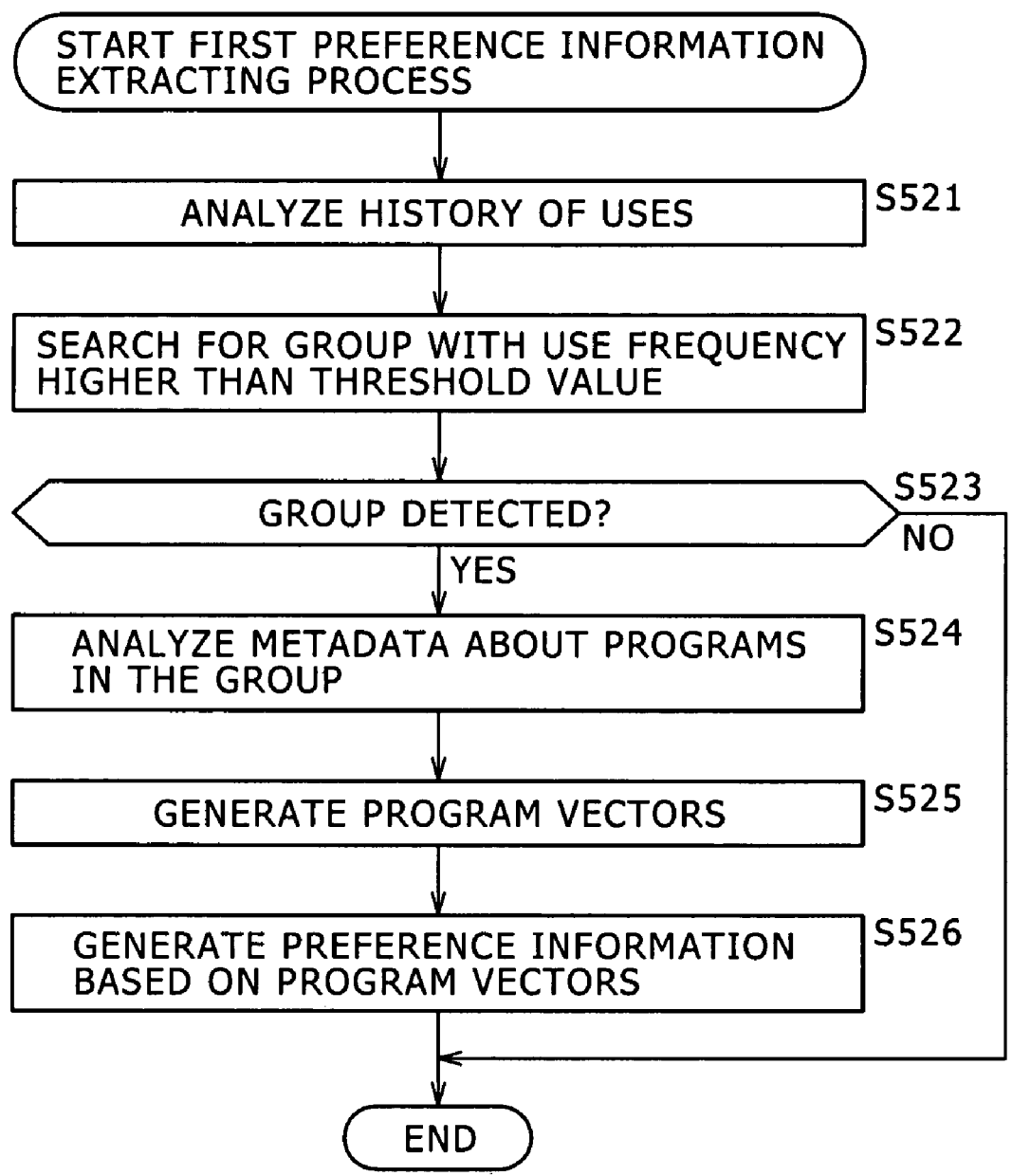
FIG. 23 is a flowchart of steps constituting a first preference information extracting process.

Whereas the user preference information generating process of FIG. 9 was shown getting group IDs stored as user preference information, this is not limitative of the invention. Alternatively, it is possible to generate more detailed preference information based on a plurality of attributes included in the metadata about programs and to let programs be recommended in accordance with the preference information thus generated. Described below with reference to FIG. 23 is a first preference information extracting process, i.e., a first example of generating more detailed preference information based on a plurality of attributes included in program metadata. This process is carried out by the content recommendation server 4 illustratively over a predetermined time period (e.g., a fixed time of day every week).

In step S521, the CPU 11 analyzes a history of uses. In this step, as in step S2 of FIG. 9, the CPU 11 acquires from the client device 5 metadata (carrying group IDs) about the contents used over the predetermined period of time, and analyzes the acquired data for use frequencies of each of the groups (FIG. 10) or for their normalized use frequencies (FIG. 11B).

In step S522, the CPU 11 determines whether or not there is any group whose use frequency has exceeded a predetermined threshold value. Alternatively, a group may be detected in this step if at least a predetermined number of programs in that group have been delivered.

In step S523, the CPU 11 determines whether or not any such group has been detected. If a relevant group is found to exist, step S524 is reached. In step S524, the CPU 11 analyzes metadata about the program belonging to the detected group. If there exist a plurality of programs in the group, then the CPU 11 analyzes metadata about these programs. In step S525, the CPU 11 generates program vectors based on the program metadata analyzed in step S524.

FIG. 24 shows how a typical program vector PP generated in the process above is structured. In this example, the program vector PP is constituted by factors representative of the attributes in the program metadata analyzed in step S524, the attributes being "title (name of program; factor Tm)", "genre (factor Gm)", "persons (factor Pm)", "station (factor Sm)", "hour (factor Hm)", etc., so that PP=(Tm, Gm, Pm, Sm, Hm, etc.). Each of the factors Tm, Gm, Pm, Sm, Hm, etc., is also structured as a vector made up of a plurality of subsumed factors.

For example, the vector Sm corresponding to the attribute "station" may represent a relatively limited collection of broadcast stations such as MHK General, MHK Educational, Asia TV, TAS, Fushi, TV Nippon, Toto, MHK BS1, MHK BS2, and WOWO (all imaginary station names). In that case, the vector may be structured as Sm={MHK General, MHK Educational, Asia TV, TAS, Fushi, TV Nippon, Toto, MHK BS1, MHK BS2, WOWO} in which the applicable station is denoted by "1" and all other stations by "0". For example, if the applicable station is WOWO, then the vector representative of the item "station" is given as Sm={0, 0, 0, 0, 0, 0, 0, 0, 0, 1}.

The vector Gm corresponding to the attribute "genre" also represents a limited assortment of options such as dramas, variety shows, sports, movies, music, child-oriented and educational programs, cultural and documentary programs, news and reports, and others. In that case, the vector may be structured as Gm={dramas, variety shows, sports, movies, music, child-oriented and educational programs, cultural and documentary programs, news and reports, and others} in which the applicable genre is denoted by "1" and all other genres by "0". For example, if the applicable genre is cultural and documentary programs, then the vector representative of the item "genre" is given as Gm={0, 0, 0, 0, 0, 0, 1, 0, 0}.

The vector Hm corresponding to the attribute "hour" is defined in the same manner as the vector Sm of the attribute "station" and the vector Gm of the attribute "genre".

On the other hand, there are attributes such as "title" and "persons" which are difficult to limit in terms of factors. In such cases, an attribute is structured with factors each formed by a word representing the attribute in question and by a numeral denoting the frequency of appearance of the word in question. For example, if an attribute in program metadata is given as "person A, person B, etc.", then the vector corresponding to the attribute "persons" is given as Pm={(person A-1), (person B-3), etc.}. The factors (person A-1) and (person B-3) indicate that the words "person A" and "person B"

constituting the metadata attribute "persons" have been detected once and three times respectively.

It might happen that a plurality of programs are detected in step S522. In that case, a program vector is generated in step S525 for each of the detected programs.

In step S526, the CPU 11 generates preference information by integrating the program vectors generated in step S525. In this step, the attributes stemming illustratively from a plurality of program vectors are put together to generate the preference information.

FIG. 25 shows typical preference information thus generated. In this example, the preference information is provided as a vector UP made up of factors representative of attributes "title (of program; factor Tup)", "genre (factor Gup)", "person (factor Pup)", "station (factor Sup)", "hour (factor Hup)", etc., so that UP=(Tup, Gup, Pup, Sup, Hup, etc.). Each of the factors Tup, Gup, Pup, Sup, Hup, etc., is also structured as a vector made up of a plurality of subsumed factors.

In the example above, the vector corresponding to the attribute "title (of program)" is given as Tup={(title 1-12), (title 2-3), etc.}. It means that the attribute "title" of preference information includes the factors (title 1) and (title 2) and that these factors have their degrees of importance set for 12 and 3 respectively.

A degree of importance stands for how much the user prefers a factor of interest. When a program vector is added to another vector containing the same factor, the degree of importance is incremented by 1. Illustratively, suppose that preference information is generated on the basis of 20 program vectors PP1 through PP20 and that three program vectors PP5, PP10 and PP17 each have a factor "title 2" in their attribute Tm. In that case, the degree of importance for the factor "title 2" of Tup is set for 3.

The vector corresponding to the attribute "genre" is defined illustratively as Gup={(dramas-25), (variety shows-34), (sports-42), (movies-37), (music-73), (child-oriented and educational programs-120), (cultural and documentary programs-3), (news and reports-5), and (others-23)}. The vector is thus structured with the factors each included in the attribute "genre" and each carrying the degree of importance applicable to the factor in question.

The vector Sup corresponding to the attribute "station" of the preference information, the vector Pup corresponding to the attribute "persons", etc., are defined in the same manner as described above, each vector being formed by the factors constituting the attribute in question and by the degrees of importance of the constituent factors.

It might happen that in step S523, the CPU 11 does not detect any group whose contents have been viewed at least a predetermined number of times. In that case, the CPU 11 skips steps S524 through S526 and terminates the processing.

The foregoing description showed how preference information is generated. Because the preference information is generated on the basis of metadata about the programs that have been viewed or delivered at least a predetermined number of times, the user's preferences are reflected accurately in the generated information.

Alternatively, preference information may be generated in step S521 regarding a particular user by analyzing his or her history of content uses. As another alternative, general preference information (i.e., common to a plurality of users) may be generated in step S521 by analyzing a plurality of users' histories of content uses.

Where the first preference information extracting process described above with reference to FIG. 23 is carried out, the degree of importance is incremented every time a program vector containing the same factor is added up. It follows that the degrees of importance for the factors included in the metadata about the programs frequently watched by the user could become inordinately high. This could result in biased preference information. For example, if the user unfailingly watches a program broadcast everyday (i.e., Monday through Friday), the degree of importance for a certain factor (e.g., personality A) included in the metadata about that program can become extremely high compared with other factors. In such a case, it is possible to keep the metadata about the frequently watched programs (i.e., staple programs) from getting reflected in the preference information. That is accomplished by a second preference information extracting process described below with reference to FIG. 26, i.e., a second example of generating preference information based on a plurality of attributes included in program metadata.

Steps S541 through S543 are the same as steps S521 through S523 in FIG. 23 and thus will not be discussed further. In step S544, the CPU 11 checks to determine whether or not the program or programs in the group detected in step S542 are staple programs. The check in step S544 is made on the basis of the staple flag having been set by the staple program setting process discussed above with reference to FIG. 22.

If in step S544 the checked programs are not found to be staple programs, step S545 is reached. In step S545, the CPU 11 analyzes metadata about the programs in the same manner as in steps S524 and S525 of FIG. 23. In step S546, the CPU 11 generates program vectors in accordance with the analyzed data. In step S547, the CPU 11 generates preference information based on the program vectors.

If in step S544 the checked program or programs are found to be staple programs, then steps S545 through S547 are skipped.

When the steps above are carried out as described, preference information is generated without regard to staple programs. This makes it possible to prevent one-sided preference information from getting generated.

According to the above-described process of FIG. 23, program vectors are generated similarly for all those programs in a group that have been viewed at least a predetermined number of times (or frequency). Illustratively, suppose that there are programs A1, A2, A3, etc., broadcast in a series (called the serial program A where there is no need to distinguish individual programs; other programs of similar nature are also called likewise), and programs B1, B2, B3, etc., (each belonging to a different group). In that case, if the threshold use frequency for each group is three times, then the program A viewed three times (more precisely, a series of programs of which three have been watched) are given substantially the same program vector as the program B viewed ten times (serialized 10 programs having been watched).

However, the user might be differently knowledgeable about the serial programs A and B. For example, the user is highly likely to know much about the serial program B watched ten times (e.g., the user may be familiar with the corners and personalities appearing in the program) while not so knowledgeable about the program A viewed only three times. In fact, the user might wish to pass up the serial program A from time to time. Given such considerations, it may be desirable to generate preference information reflecting degrees of familiarity with the programs having been watched. That is accomplished by a third preference information extracting process described below with reference to FIG. 26, i.e., a third example of generating preference information based on a plurality of attributes included in program metadata.

Steps S561 through S565 are the same as steps S521 through S525 in FIG. 23 and thus will not be discussed further. In step S566, the CPU 11 specifies degrees of the user's familiarity with programs. A degree of familiarity is specified on the basis of how many times a serial program (i.e., of a group) has been used, as analyzed in step S561 earlier. Illustratively, one of three degrees of familiarity may be set for the serial program depending on its use frequency. If the use frequency is 0.1 or higher, the degree of familiarity is set for "high"; if the use frequency is at least 0.05 and less than 0.1, the degree of familiarity is set for "middle"; if the use frequency is less than 0.05, the degree of familiarity is set for "low".

The three degrees of familiarity are not limitative of the invention; there may obviously be more or fewer degrees of familiarity. Alternatively, familiarity may be expressed not in degrees but in numbers. Familiarity may also be expressed based not on how often each program has been watched but on how many programs have been delivered.

In step S567, the CPU 11 gives weights to the program vectors generated in step S565 on the basis of the acquired degrees of familiarity. Illustratively, the degree of importance is multiplied threefold for the preference information generated on the basis of the factors included in the program vector whose degree of familiarity is "high"; the degree of importance is multiplied twofold for the preference information generated on the basis of the factors included in the program vector whose degree of familiarity is "middle"; the degree of importance is multiplied by 1 for the preference information generated on the basis of the factors included in the program vector whose degree of familiarity is "low".

In step S568, the CPU 11 generates preference information based on the program vectors weighted in step S567. At this point, suppose that a vector Pm1 constituting a program vector PP1 of which the degree of familiarity is "high" is given as Pm1=(person A); that a vector Pm2 constituting a program vector PP2 of which the degree of familiarity is "middle" is given as Pm2=(person B); and that a vector Pm3 constituting a program vector PP3 of which the degree of familiarity is "low" is given as Pm3=(person C). In that case, the vector Pup corresponding to the attribute "persons" of preference information is given as Pup={(person A-3), (person B-2), (person C-1)}.

The preference information reflecting the user's degrees of familiarity with contents is generated as described above. Alternatively, preference information may be generated in step S561 regarding a particular user by analyzing his or her history of content uses. As another alternative, general preference information (i.e., common to a plurality of users) may be generated in step S561 by analyzing a plurality of users' histories of content uses. For example, on the basis of general preference information, programs (i.e., contents) may be recommended to users whose histories of content uses have yet to be accumulated. Since preference information is generated as a reflection of the user's preferences, having recourse to that information makes it possible to recommend programs which, regardless of their ratings, are deemed appreciably suitable to the user's preferences.

In the example above, the degree of importance for preference information is incremented every time a program is viewed. At times, however, it may be necessary to decrement such degrees of importance. Illustratively, the user might cancel a staple program that has been reserved automatically for unattended recording. The program whose recording reservation is canceled was viewed frequently but is passed up this time presumably for the user's loss of interest in the program content. In such a case, the user's preference information is changed based on the metadata about the program whose recording reservation has been canceled.

Figure 28:
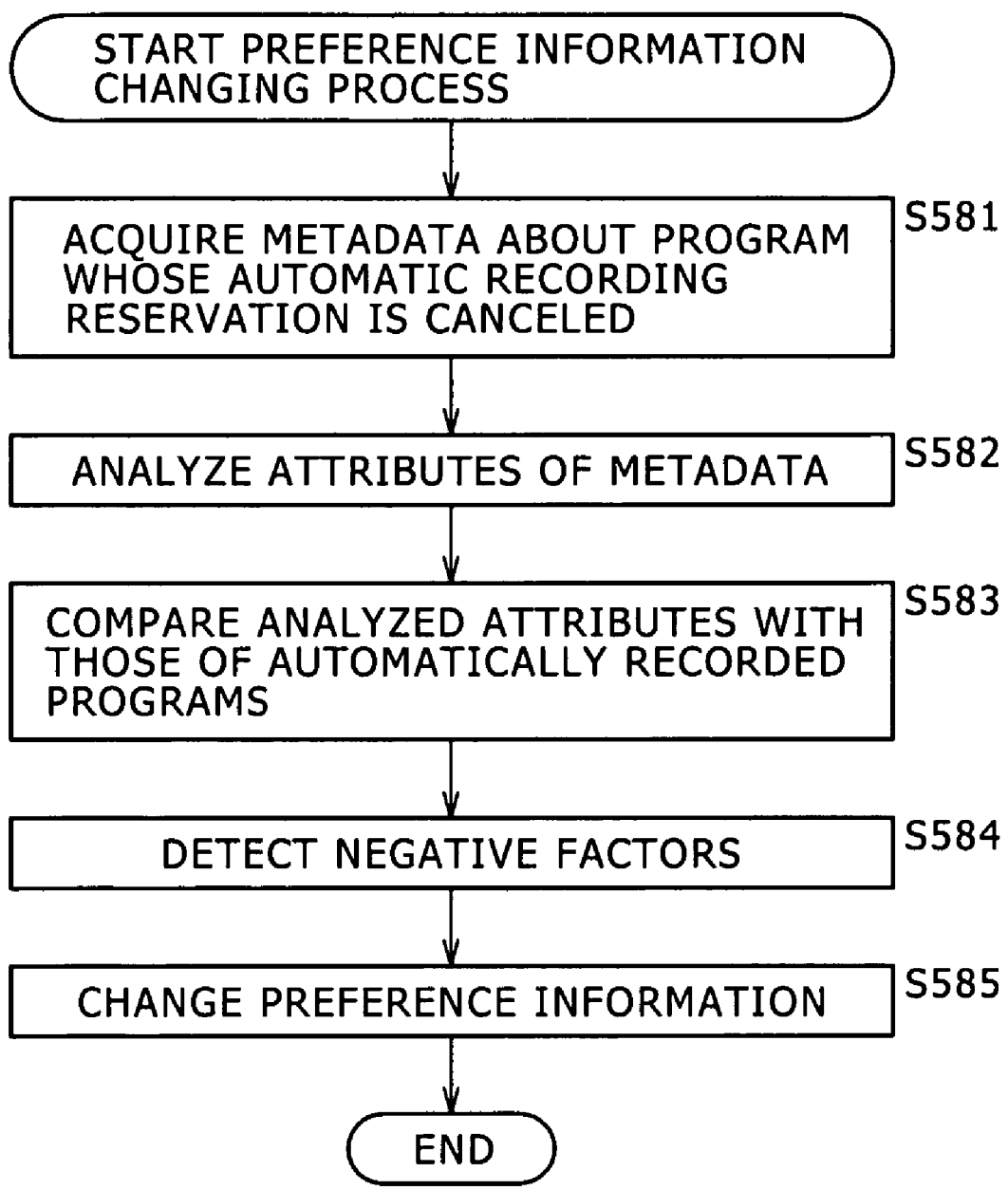
FIG. 28 is a flowchart of steps constituting a preference information changing process.

Such a preference information changing process will now be described with reference to FIG. 28. This process is carried out by the content recommendation server 4 when the CPU 51 of the client device 5 detects cancellation of the automatic recording reservation for a given program and notifies the content recommendation server 4 of the canceled program via the network 6.

In step S581, the CPU 11 acquires metadata about the program of which the automatic recording reservation has been canceled (e.g., the third of 10 installments of a serial program). In step S582, the CPU 11 analyzes attributes in the acquired metadata. In step S583, the CPU 11 compares the attributes of the preference information about the program for which the automatic recording reservation is maintained, with the attributes of the metadata about the program installment whose automatic recording reservation has been canceled. In step S584, the CPU 11 detects "negative" factors derived from the comparison.

For example, suppose that a serial program X was set automatically for unattended recording and that the user has canceled the recording reservation for one of its installments. Suppose also that a vector Pm1 corresponding to the attribute "persons" is given as Pm1=(person A, person B) in a program vector PP1 generated from the metadata about the installments of the program X for which the automatic recording reservations are maintained, and that a vector Pm2 corresponding to the attribute "persons" is given as Pm2=(person A, person B, person C) in a program vector PP2 generated from the metadata about that installment of the program X for which the automatic recording reservation has been canceled. In that case, the canceled installment of the program X is thought to be rejected by the user presumably because the person C appeared in that program. Thus in step S584 the factor "person C" is detected as the negative factor.

In step S585, the CPU 11 changes the user's preference information based on the negative factor or factors detected in step S584. At this point, the degree of importance for the negative factor is decremented. If the vector Pup corresponding to the attribute "persons" in the preference information is given illustratively as Pup={(person A-5), (person B-2), (person C-3)}, then the vector is changed in step S585 into Pup={(person A-5), (person B-2), (person C-2)}. That is, the degree of importance for the factor "person C" is decremented by 1.

Preference information is changed as described above. When the degree of importance for any factor not preferred by the user is lowered in that manner, it is possible to recommend to the user the programs (contents) which are more to the user's preference.

Whereas it was shown above how preference information is generated on the basis of the metadata about serial programs that have been viewed at least a predetermined number of times, the user might become bored if supplied always with program recommendations based solely on the preference information thus generated. That snag is bypassed by the inventive arrangements taking special notice of a program or programs that have been viewed for the first time. Because the user is assumed to have much interest in such a program that was never watched before, special preference information may be generated on the basis of the metadata about that program.

Figure 29:
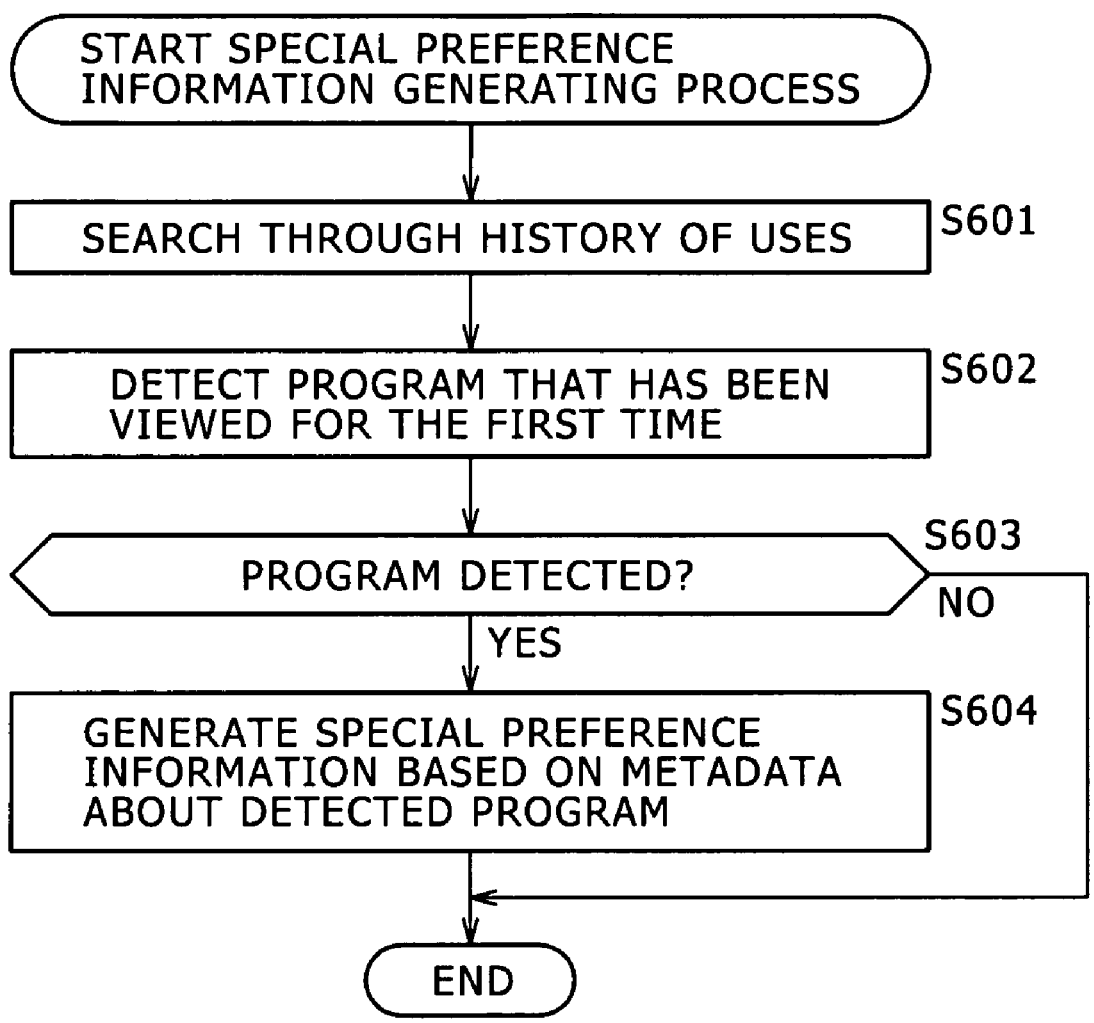
FIG. 29 is a flowchart of steps constituting a special preference information generating process.

Described below with reference to FIG. 29 is a special preference information generating process carried out by the content recommendation server 4. This process may be started either manually by the user inputting a suitable command or automatically on a periodical basis (e.g., every week).

In step S601, the CPU 11 searches through the user's history of uses. In this step, the CPU 11 acquires from the client device 5 the metadata about the contents (carrying group IDs) that have been used over a predetermined period of time (e.g., for the past six months), so as to analyze the use frequency for each of the groups involved (see FIG. 10).

In step S602, the CPU 11 detects a serial program that has been watched, once (i.e., a group of programs, one of which has been viewed). In step S603, the CPU 11 determines whether or not such a serial program has been detected. If the serial program is detected, step S604 is reached. In step S604, the CPU 11 generates special preference information based on the metadata about the program belonging to the detected serial program. In this step, program vectors are first generated from the program metadata in the same manner as in steps S524 through S526 of FIG. 23, and special preference information is generated on the basis of the program vectors generated accordingly. If in step S603 no such serial program is detected, then the process of step S604 is skipped. This is how special preference information is generated on the basis of the metadata about programs that have been watched for the first time by the user.

Described below is how contents are recommended on the basis of the preference information generated by the process described above with reference to FIG. 23, 26 or 27.

Figure 26:
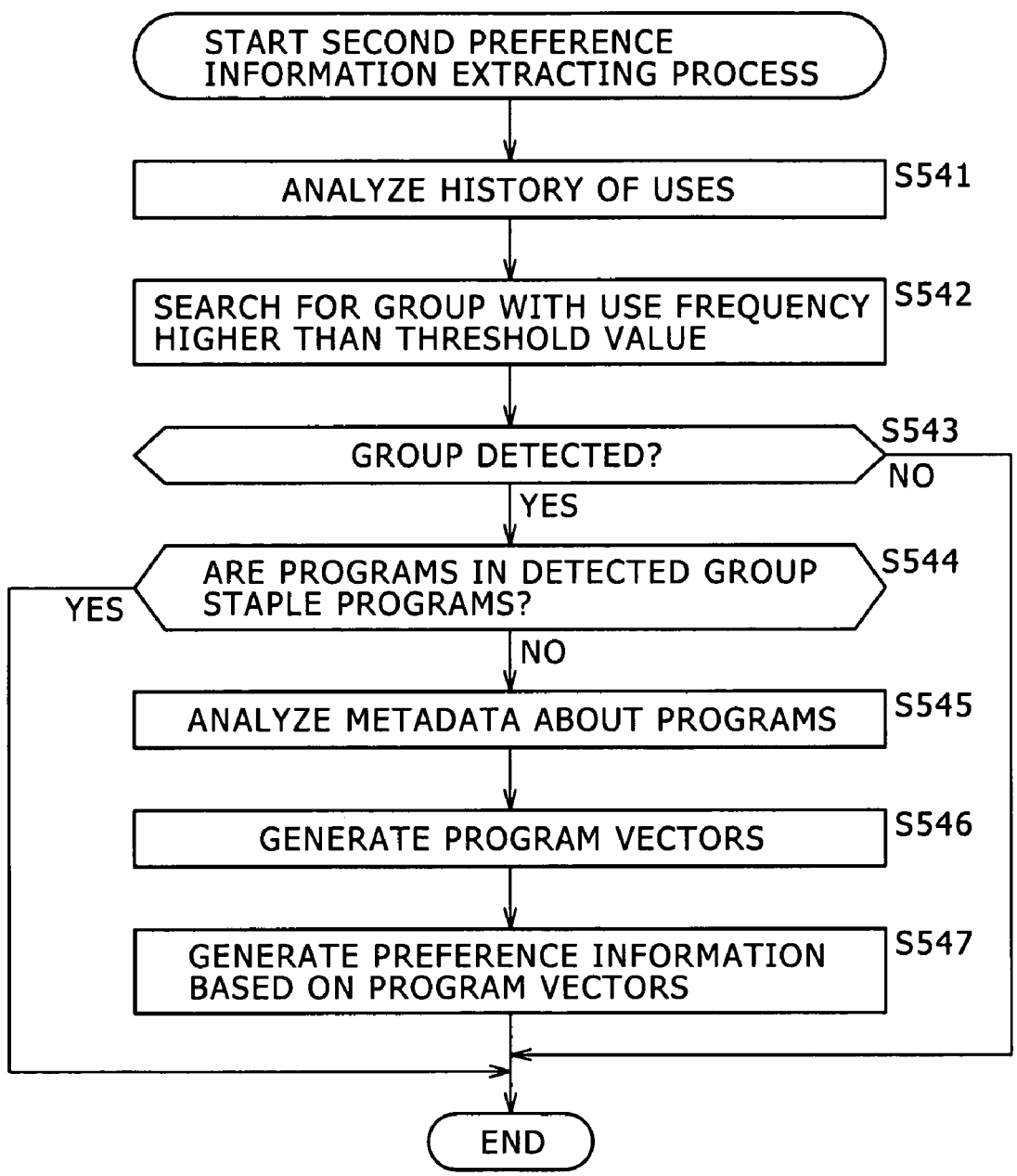
FIG. 26 is a flowchart of steps constituting a second preference information extracting process.
Figure 27:
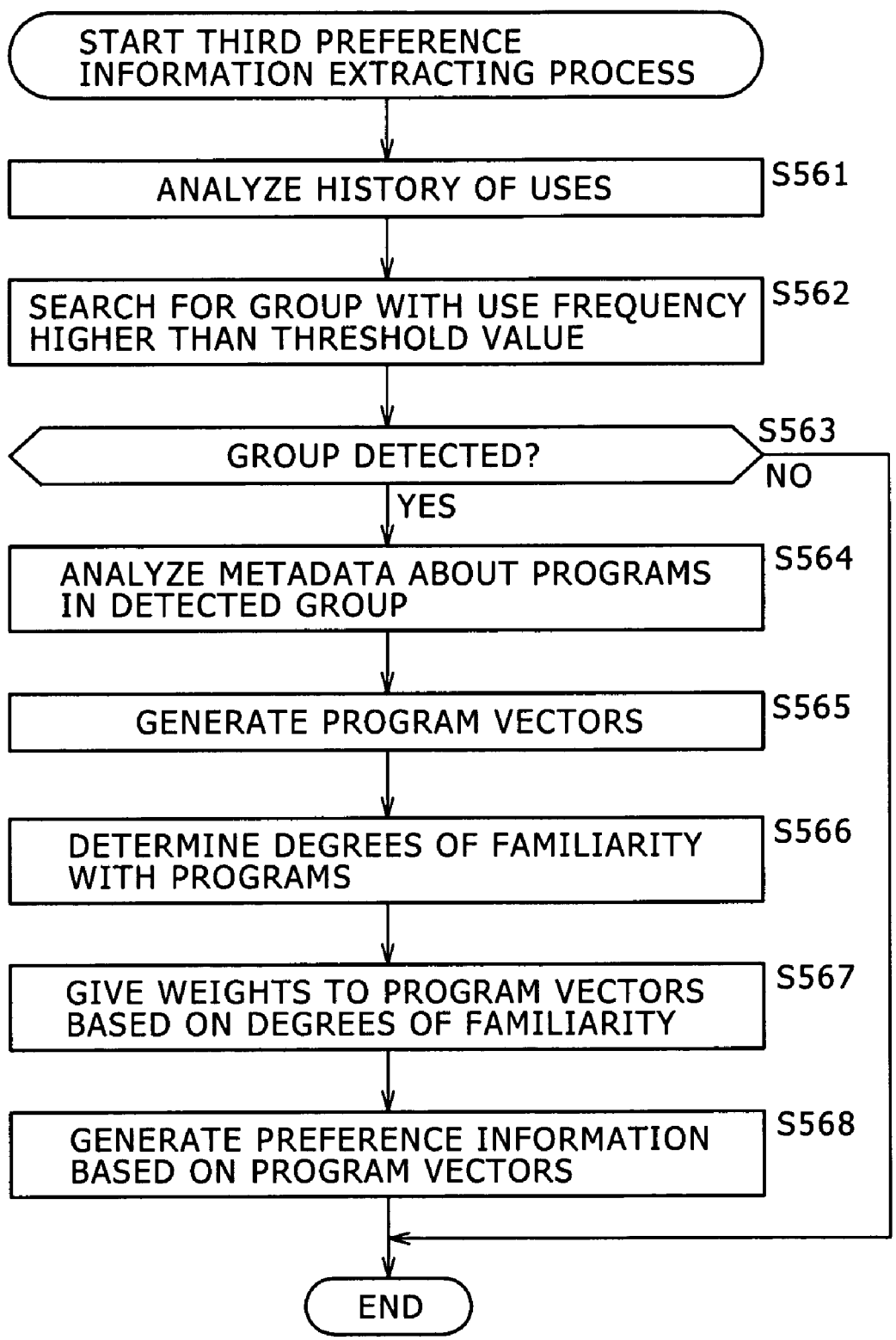
FIG. 27 is a flowchart of steps constituting a third preference information extracting process.
Figure 30:
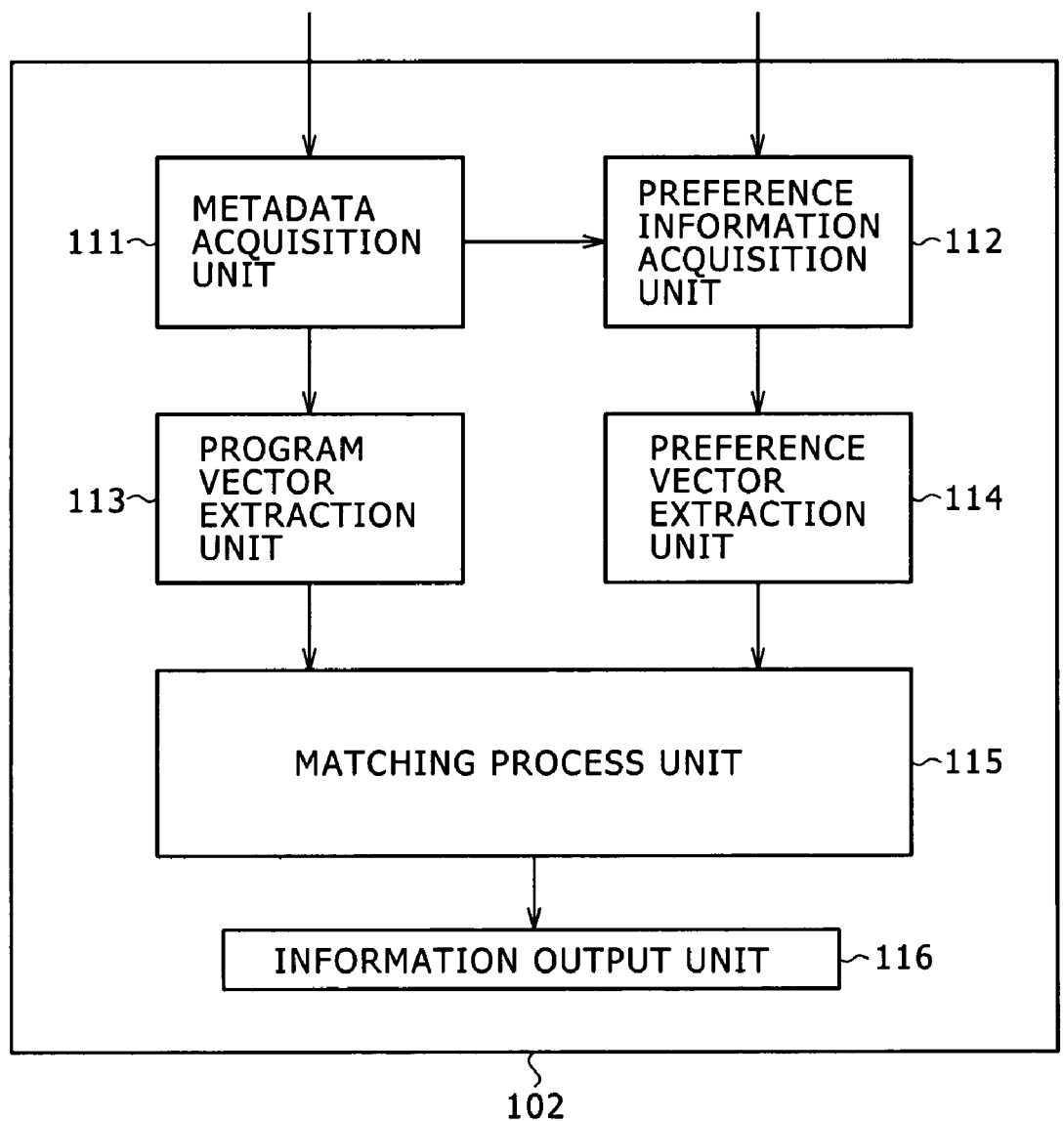
FIG. 30 is a block diagram showing a typical functional structure of the CPU included in FIG. 7.

FIG. 30 is a block diagram showing a typical functional structure of the CPU 11 in the content recommendation server 4, the structure being in effect when the CPU 11 recommends contents based on the preference information generated by the process of FIG. 23, 26 or 27. This functional structure includes a metadata acquisition unit 111 for acquiring program metadata and a preference information acquisition unit 112 for acquiring a particular user's preference information.

The program metadata acquired by the metadata acquisition unit 11 is output to a program vector extraction unit 113. The program vector extraction unit 113 extracts program vectors from the received metadata. The preference information acquired by the preference information acquisition unit 112 is output to a preference vector extraction unit 114 so that preference vectors will be extracted from the preference information. The program vectors extracted by the program vector extraction unit 113 and the preference vectors extracted by the preference vector extraction unit 114 are output to a matching process unit 115. In turn, the matching process unit 115 calculates degrees of similarity between the program vectors and the preference vectors.

A plurality of program vectors are matched against each preference vector. The matching process unit 115 selects a predetermined number of program vectors in descending order of their degrees of similarity to the preference vector. The matching process unit 115 then outputs to an information output unit 116 the metadata about the programs corresponding to the selected program vectors.

The information output unit 116 stores illustratively into the storage unit 18 the metadata about the programs selected by the matching process unit 115.

Figure 31:
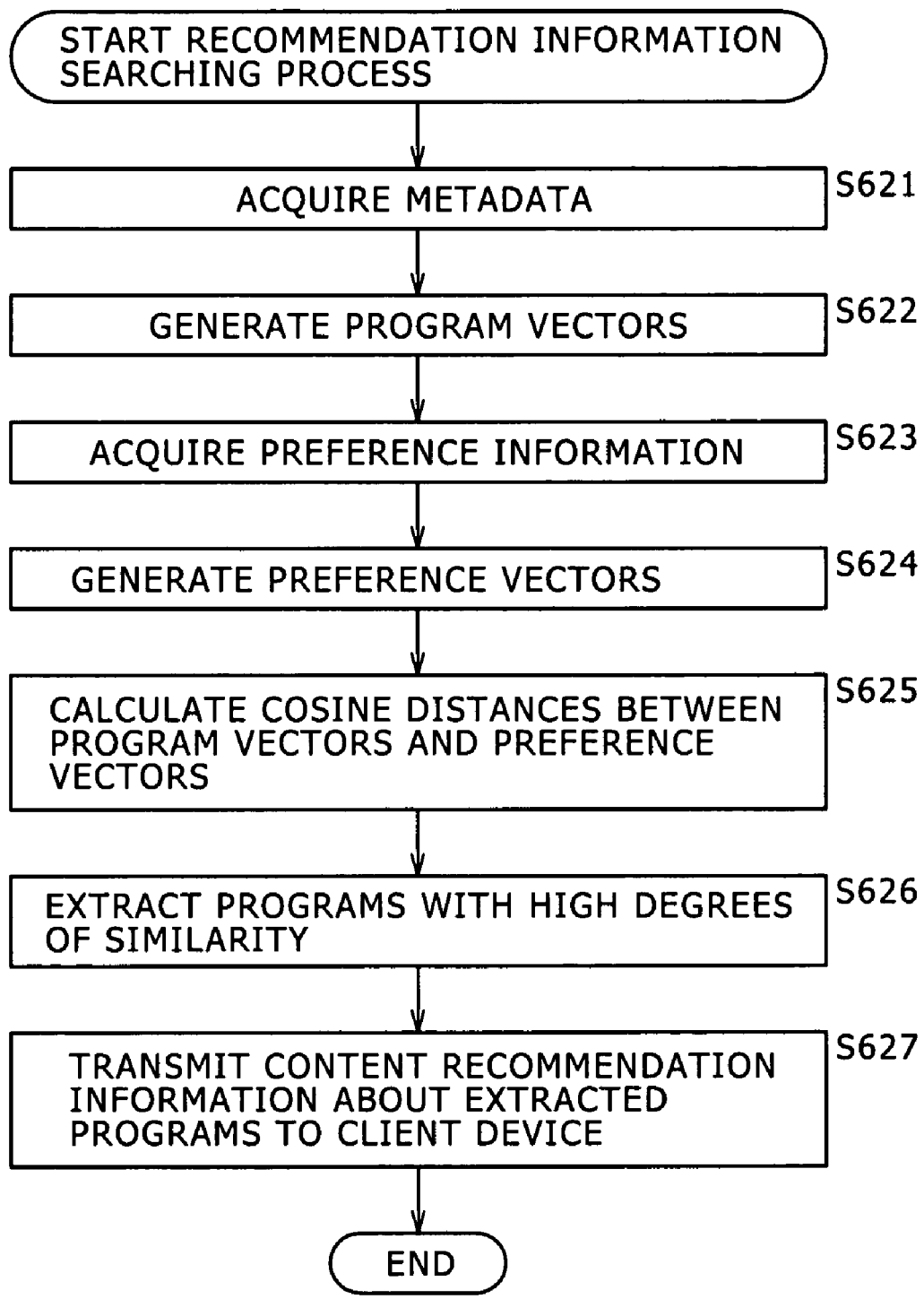
FIG. 31 is a flowchart of steps constituting a recommendation information searching process.

Described below with reference to the flowchart of FIG. 31 is a recommendation information searching process. In step S621, the metadata acquisition unit 111 acquires metadata about contents (programs). In this step, the metadata about a plurality of programs (e.g., programs to be broadcast over the next week) is acquired in accordance with predetermined rules. In step S622, the program vector extraction unit 113 extracts program vectors from the program metadata acquired in step S621. At this point, program vectors of a plurality of programs are extracted in the same manner as in the extraction of program vectors described above with reference to FIG. 24.

In step S623, the preference vector extraction unit 114 acquires preference information about a particular user. In step S624, the preference vector extraction unit 114 generates preference vectors. In this step, a preference vector may be generated in the form of preference information such as that shown in FIG. 25, or in the form of a specifically extracted attribute constituting the preference information.

In step S625, the matching process unit 115 illustratively calculates a cosine distance between a program vector PP generated in step S622 on the one hand, and a preference vector UP generated in step S624 on the other hand. If the angle formed between the vector PP and the vector UP is assumed to be θ, then cos θ=PP·UP/|PP||UP|.

For example, if the preference vector is given as UP=(Tup, Gup, Pup, Sup, Hup, etc.,) wherein the vector Pus is given as Pup={(person A-1), (person B-1), (person C-1)}, and if the program vector is given as PP=(Tm, Gm, Pm, Sm, Hm, etc.,) wherein the vector Pm is given as Pm={(person A-1), (person D-1), (person E-1)}, then the cosine distance cos θp is calculated as follows:

$$\cos \theta p = (1 \cdot 1)/(\sqrt{3} \times \sqrt{3}) = 1/3 \quad (1)$$

where, the symbol "·" stands for a scalar product and "×" for a scalar operation.

In the same manner as with cos θp, cosine distances cos θt, cos θg, cos θs, cos θh, etc., are calculated between the vectors Tup, Gum, Sup, Hup, etc., on the one hand, and the vectors Tm, Gm, Sm, Hm, etc., on the other hand. The degree of similarity Sim is then calculated by adding up the calculated cosine distances as follows:

$$Sim = \cos \theta t + \cos \theta g + \cos \theta p + \cos \theta s + \cos \theta^h \quad (2)$$

The foregoing description showed how degrees of similarity are calculated between the preference vectors UP and the program vectors PP. Specifically, the degrees of similarity are calculated between one preference vector UP on the one hand, and a plurality of program vectors PP on the other hand. This makes it possible to determine the degrees of similarity between the user's preference information and the metadata about each of the programs checked.

In step S626, the matching process unit 115 selects the metadata about programs having high degrees of similarity. In this step, a predetermined number (e.g., 10) of program vectors PP are selected in descending order of their degrees of similarity (i.e., Sim values) calculated in step S625. The metadata about the programs corresponding to the selected program vectors PP is then output. Alternatively, it is possible to select all program vectors PP whose degrees of similarity are found higher than a predetermined value in order to output the metadata about the programs corresponding to the selected program vectors PP.

In step S627, the information output unit 116 sends to the client device 5 content recommendation information about the programs extracted in step S626. This is how programs are recommended based on the user's preference information.

Figure 32:
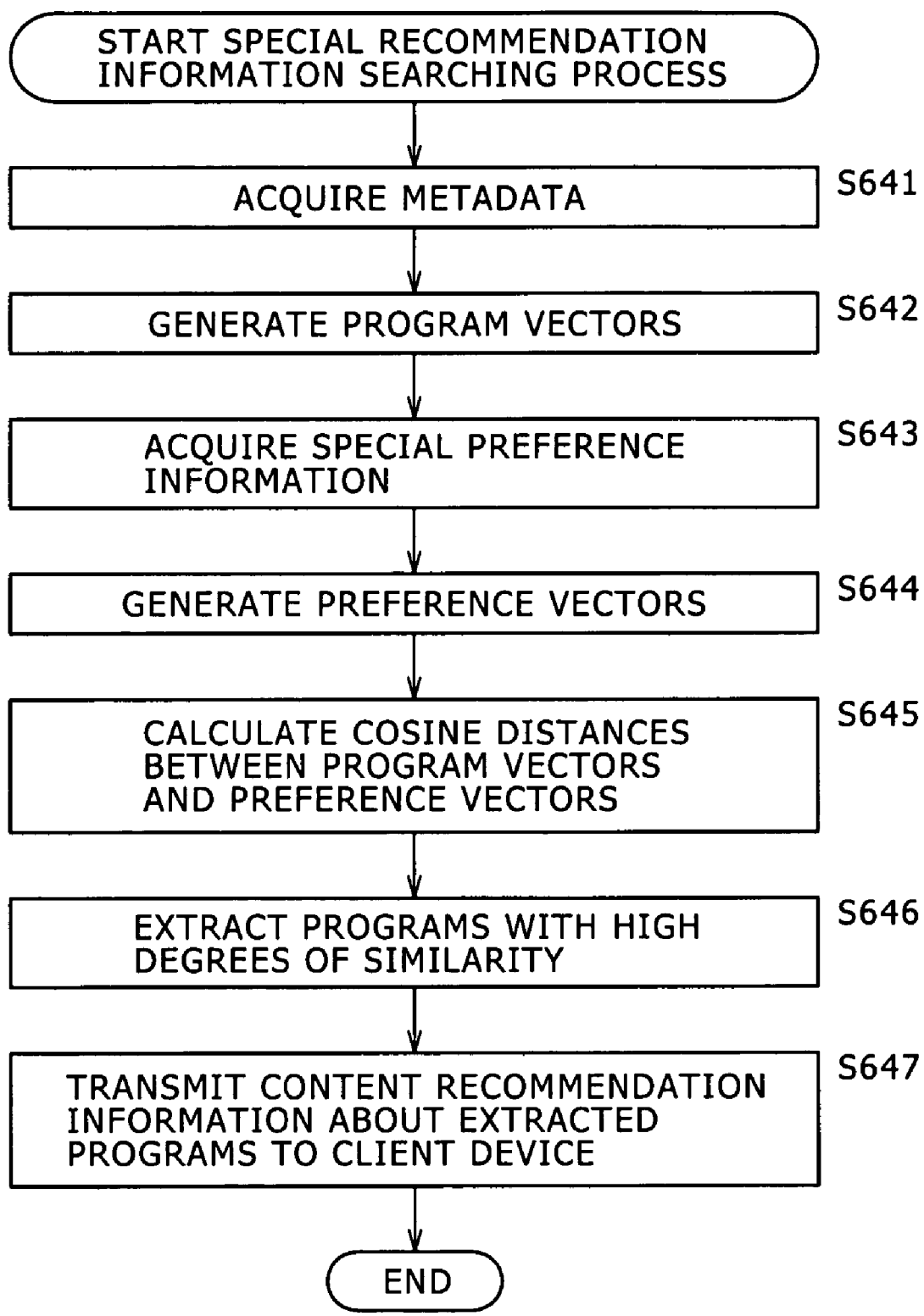
FIG. 32 is a flowchart of steps constituting a special recommendation information searching process.

Programs may also be recommended in accordance with the special preference information generated by the process discussed above with reference to FIG. 29. A special preference information searching process performed by the content recommendation server 4 is described below with reference to FIG. 32. This process may be started either manually by the user inputting a suitable command or automatically on a periodical basis (e.g., every week).

Steps S641 and S642 are the same as steps S621 and S622 in FIG. 31 and thus will not be described further.

In step S643, the preference vector extraction unit 114 acquires special preference information. In this step, the special preference information generated by the special preference information generating process of FIG. 29 is obtained. In step S644, the preference vector extraction unit 114 generates preference vectors based on the special preference information acquired in step S643.

Steps S645 and S646 are the same as step S625 and S626 in FIG. 23 and thus will not be described further.

In step S627, the information output unit 116 sends to the client device 5 the content recommendation information about the programs extracted in step S646.

This is how contents are recommended on the basis of special preference information. As described above, special preference information is generated from the metadata about the programs that have been viewed by the user for the first time. Recommending contents to users based on such special preference information helps to furnish them with unexpected programs giving fresh impressions.

The series of steps or processes described above may be executed alternatively by software. For the software-based processing to take place, the programs constituting the software may be either incorporated beforehand in dedicated hardware of a computer or installed from a recording medium into a general-purpose personal computer or like equipment capable of executing diverse functions based on the installed programs.

As shown in FIGS. 7 and 8, the recording medium which is offered to users carrying the programs to be installed may illustratively be a package medium constituted by the magnetic disk 31 or 71 (including flexible disks), the optical disk 32 or 72 (including CD-ROM (Compact Disc-Read Only Memory) and the DVD (Digital Versatile Disk)), the magneto-optical disk 33 or 73 (including MD (Mini-Disk; registered trademark)), or the semiconductor memory 34 or 74.

In this description, the steps which are stored on the recording medium and which describe the programs to be executed represent not only the processes that are to be carried out in a time series but also processes that may be performed parallelly or individually.

In this specification, the term "system" refers to an entire configuration made up of a plurality of component devices.

INDUSTRIAL APPLICABILITY

According to this invention, contents are recommended on the basis of users' content use frequencies detected for each of the groups of contents that have been grouped in terms of grouping items each made up of constituent items representative of content attributes.

The invention claimed is:

1. An information processing apparatus comprising:
grouping means for organizing delivered contents into groups each constituted by the contents which are given the same group identification (ID) for having degrees of similarity higher than a predetermined value regarding a grouping item including at least one attribute item representative of a content attribute;
calculating means for calculating frequency of uses of the contents with respect to each of the group IDs;
generating means for generating user preference information indicating preferences of a user based on the use frequency calculated by said calculating means, said generating means generating the user preference information based on a normalized use frequency for each group, said normalized use frequency normalized by dividing each use frequency of each content in each respective group by a number of all the contents in the respective group delivered during a time period corresponding to a use history; and
recommending means for giving content recommendations based on said user preference information generated by said generating means.

2. The information processing apparatus according to claim 1, wherein a grouping attribute constituted by an attribute item indicating a broadcast time slot and by at least one other attribute item is established for said information processing apparatus; and wherein said grouping means organizes said delivered contents into groups by the established grouping attribute.

3. The information processing apparatus according to claim 1, wherein the grouping item constituted by at least an attribute item indicating a broadcast time slot and the grouping item formed by other attribute items are established for said information processing apparatus; and wherein said grouping means organizes said delivered contents into groups by each of the established grouping items.

4. The information processing apparatus according to claim 1, wherein said grouping means morphologically analyzes constituent items making up said attribute item of said contents, and determines degrees of similarity between constituent items making up said grouping item based on results of the analysis.

5. The information processing apparatus according to claim 1, wherein said generating means does not utilize the use frequency of the group constituted by the contents failing to meet a predetermined condition when generating said user preference information.

6. The information processing apparatus according to claim 1, wherein said recommending means comprises:
determining means for determining whether or not said use frequency calculated by said calculating means is higher than a predetermined set value; and
setting means for setting a staple flag indicating that the recommended contents have been viewed frequently to said content recommendation information if said use frequency is found higher than said predetermined set value by said determining means.

7. The information processing apparatus according to claim 1, wherein said generating means comprises extracting means for acquiring metadata about the contents constituting the groups of which said use frequency calculated by said calculating means is higher than a predetermined set value, said extracting means further extracting vectors representing an amount of characteristics of said metadata; and wherein said generating means generates said user preference information based on said vectors extracted by said extracting means.

8. The information processing apparatus according to claim 7, wherein said generating means comprises staple determining means for determining whether or not the contents constituting the groups of which said use frequency is found higher than said predetermined set value correspond to said content recommendation information to which is set a staple flag indicating that the recommended contents have been viewed frequently; and wherein, if said staple determining means determines that said contents do not correspond to said content recommendation information carrying the set staple flag, then said extracting means acquires the metadata about said contents and extracts vectors representing an amount of characteristics of said metadata.

9. The information processing apparatus according to claim 7, wherein said user preference information is constituted by a plurality of attributes and by values representing degrees of importance of said attributes.

10. The information processing apparatus according to claim 7, wherein said generating means comprises familiarity setting means for setting degrees of familiarity with said contents based on the use frequency calculated by said calculating means; and wherein said generating means assigns weights to degrees of importance of said user preference information based on said degrees of familiarity.

11. The information processing apparatus according to claim 7, wherein said generating means comprises:
    searching means for searching for contents of which said use frequency is lower than a predetermined value on the basis of a history of uses of said contents; and special preference information generating means for generating special preference information based on metadata about the contents retrieved by said searching means.

12. The information processing apparatus according to claim 11, further comprising:
    first extracting means for extracting vectors representing an amount of characteristics of either said user preference information or said special preference information;
    second extracting means for acquiring metadata about the contents broadcast in a predetermined set time slot, and extracting vectors representing an amount of characteristics of said meta; and
    calculating means for calculating degrees of similarity between the vectors extracted by said first extracting means and those extracted by said second extracting means;
    wherein said recommending means selects a predetermined set number of the vectors extracted by said second extracting means, said vectors being selected in descending order of said degrees of similarity, said recommending means further giving content recommendations based on the metadata about the selected vectors.

13. The information processing apparatus according to claim 1, wherein said recommending means recommends content for which the normalized use frequency exceeds a preference threshold.

14. An information processing method comprising:
    organizing delivered contents into groups each constituted by the contents which are given the same group identification (ID) for having degrees of similarity higher than a predetermined value regarding a grouping item including at least one attribute item representative of a content attribute;
    calculating frequency of uses of the contents with respect to each of the group IDs;
    generating user preference information indicating preferences of a user based on the use frequency calculated in said calculating, said generating including generating the user preference information based on a normalized use frequency for each group, said normalized use frequency normalized by dividing each use frequency of each content in each respective group by a number of all the contents in the respective group delivered during a time period corresponding to a use history; and
    giving content recommendations based on said user preference information generated in said generating.

15. A non-transitory computer readable recording medium including computer executable instructions, wherein the instructions, when executed by a processor, cause the processor to perform a method comprising:
    organizing delivered contents into groups each constituted by the contents which are given the same group identification (ID) for having degrees of similarity higher than a predetermined value regarding a grouping item including at least one attribute item representative of a content attribute;
    calculating frequency of uses of the contents with respect to each of the group IDs;
    generating user preference information indicating preferences of a user based on the use frequency calculated in said calculating, said generating including generating the user preference information based on a normalized use frequency for each group, said normalized use frequency normalized by dividing each use frequency of each content in each respective group by a number of all the contents in the respective group delivered during a time period corresponding to a use history; and
    giving content recommendations based on said user preference information generated in said generating.

16. An information processing apparatus comprising:
    a grouping unit configured to organize delivered contents into groups each constituted by the contents which are given the same group identification (ID) for having degrees of similarity higher than a predetermined value regarding a grouping item including at least one attribute item representative of a content attribute;
    a calculating unit configured to calculate frequency of uses of the contents with respect to each of the group IDs;
    a preference generating unit configured to generate user preference information indicating preferences of a user based on the use frequency calculated by said calculating unit, said preference generating unit configured to generate the user preference information based on a normalized use frequency for each group, said normalized use frequency normalized by dividing each use frequency of each content in each respective group by a number of all the contents in the respective group delivered during a time period corresponding to a use history; and
    a recommending unit configured to give content recommendations based on said user preference information generated by said preference generating unit.

* * * * *